US012548615B2

(12) United States Patent
Schreck et al.

(10) Patent No.: US 12,548,615 B2
(45) Date of Patent: Feb. 10, 2026

(54) APPARATUSES AND METHODS FOR REPAIRING MULTIPLE BIT LINES WITH A SAME COLUMN SELECT VALUE

(71) Applicant: MICRON TECHNOLOGY, INC., Boise, ID (US)

(72) Inventors: John F. Schreck, Boise, ID (US); Jason M. Johnson, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 278 days.

(21) Appl. No.: 17/813,515

(22) Filed: Jul. 19, 2022

(65) Prior Publication Data

US 2024/0029781 A1    Jan. 25, 2024

(51) Int. Cl.
| G11C 11/40 | (2006.01) |
| G11C 11/4091 | (2006.01) |
| G11C 11/4097 | (2006.01) |
| G11C 29/12 | (2006.01) |

(52) U.S. Cl.
CPC ...... G11C 11/4091 (2013.01); G11C 11/4097 (2013.01); G11C 29/1201 (2013.01); G11C 2029/1204 (2013.01)

(58) Field of Classification Search
CPC . G11C 29/702; G11C 29/808; G11C 11/4091; G11C 11/4097; G11C 29/1201; G11C 2029/1204; G11C 29/76
See application file for complete search history.

(56) References Cited

U.S. PATENT DOCUMENTS

| 5,627,963 | A | * | 5/1997 | Gabillard | G06F 12/0864 714/42 |
| 5,761,138 | A | * | 6/1998 | Lee | G11C 29/846 365/189.08 |
| 6,292,413 | B1 | * | 9/2001 | Kato | G11C 11/4074 365/230.06 |
| 2002/0186600 | A1 | * | 12/2002 | Kang | G11C 29/789 365/200 |
| 2005/0018511 | A1 | * | 1/2005 | Lee | G11C 11/4097 365/207 |
| 2017/0084352 | A1 | * | 3/2017 | Park | G11C 29/44 |

* cited by examiner

*Primary Examiner* — Uyen Smet

(74) *Attorney, Agent, or Firm* — Dorsey & Whitney LLP

(57) ABSTRACT

Embodiments of the disclosure are drawn to apparatuses and methods for repairing multiple bit lines with a same column select value. A memory mat may be bordered by a first gap and a second gap. Each gap includes sets of sense amplifiers and a redundant sense amplifier set. The sense amplifier sets are activated by an enable signal and share a column select (CS) signal in common. The redundant sense amplifier set is activated by a redundant enable signal separate from the enable signal. In some embodiments, the redundant sense amplifier sets are coupled to a redundant CS signal which is separate from the CS signal.

22 Claims, 10 Drawing Sheets

APPARATUSES AND METHODS FOR REPAIRING MULTIPLE BIT LINES WITH A SAME COLUMN SELECT VALUE

BACKGROUND

This disclosure relates generally to semiconductor devices, and more specifically to semiconductor memory devices. In particular, the disclosure relates to memory, such as dynamic random access memory (DRAM). Information may be stored in memory cells, which may be organized into rows (word lines) and columns (bit lines or digit lines). At various points in manufacturing and use of a memory device, one or more memory cells may fail (e.g., become unable to store information, be inaccessible by the memory device, etc.) and may need to be repaired.

The memory device may perform repair operations. A row or column containing a failed memory cell (which may be referred to as a defective row/column, a bad row/column, or a faulty row/column) may be identified. The memory device may contain additional rows/columns of memory which may be used in repair operations (e.g., redundant rows/columns). During a repair operation, an address associated with the defective row/column may be redirected, such that the address points to a redundant row/column instead.

DETAILED DESCRIPTION

Figure 1:
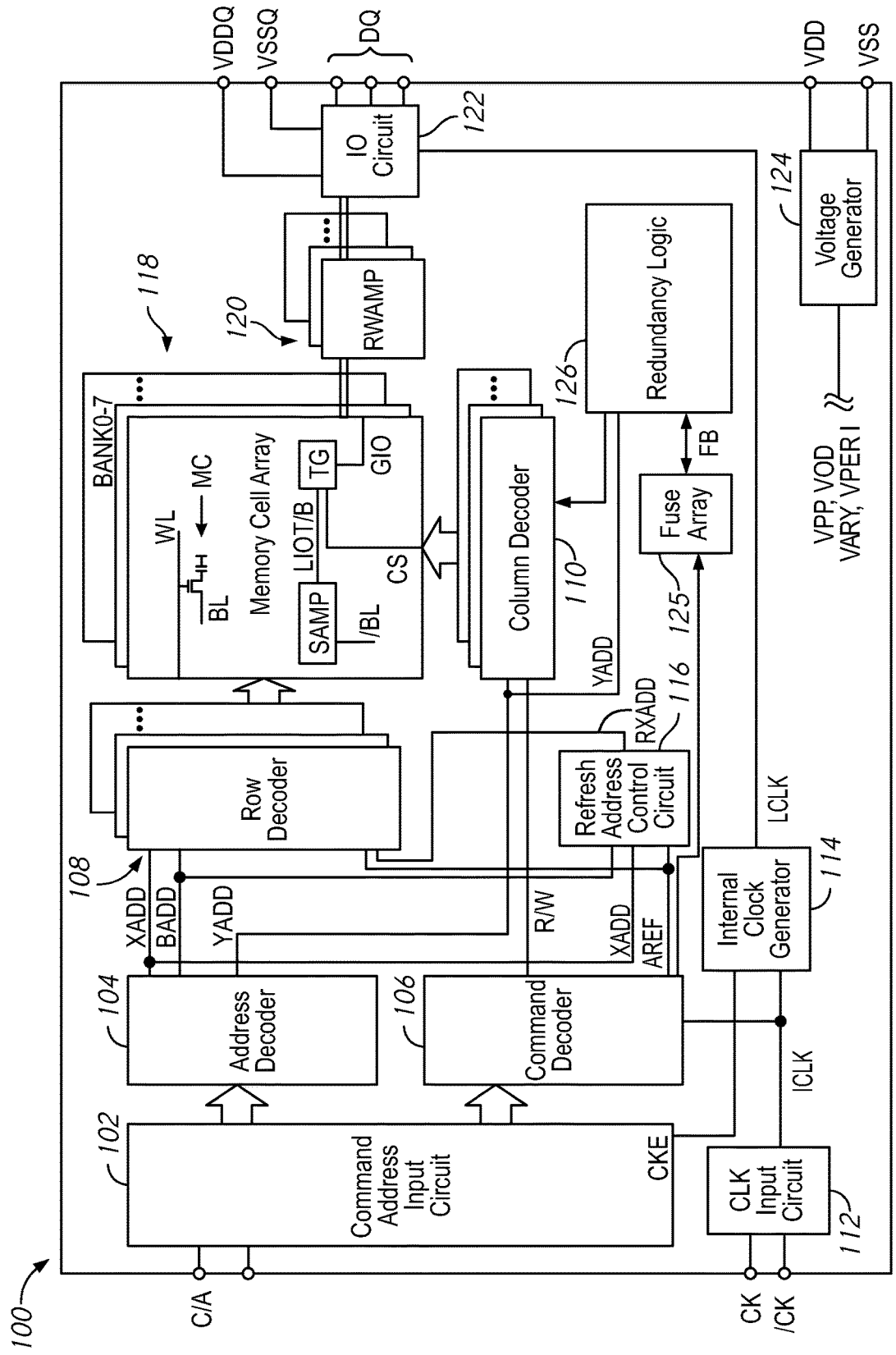
FIG. 1 is a block diagram of a semiconductor device according to some embodiments of the present disclosure.

The following description of certain embodiments is merely exemplary in nature and is in no way intended to limit the scope of the disclosure or its applications or uses. In the following detailed description of embodiments of the present systems and methods, reference is made to the accompanying drawings which form a part hereof, and which are shown by way of illustration specific embodiments in which the described systems and methods may be practiced. These embodiments are described in sufficient detail to enable those skilled in the art to practice presently disclosed systems and methods, and it is to be understood that other embodiments may be utilized and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The following detailed description is therefore not to be taken in a limiting sense, and the scope of the disclosure is defined only by the appended claims.

Semiconductor memory devices may store information in a plurality of memory cells. The information may be stored as a binary code, and each memory cell may store a single bit of information as either a logical high (e.g., a "1") or a logical low (e.g., a "0"). The memory cells may be organized at the intersection of word lines (rows) and bit lines (columns). The memory may further be organized into one or more memory banks, each of which may include a plurality of rows and columns. During operations, the memory device may receive a command and an address which specifies one or more rows and one or more columns and then execute the command on the memory cells at the intersection of the specified rows and columns (and/or along an entire row/column).

Each bit line may be coupled to a sense amplifier, which may be activated during access operations to read or write data from or to the memory cells at the intersection of the bit line and an activated word line. The bit lines may be selectively coupled to global input/output (GIO) lines, which may transmit data to/from the bit line. Sense amplifiers may be grouped together in sets which share a GIO line. An enable signal may activate all of the sense amplifiers in the set and a column select (CS) signal may determine which of the sense amplifiers (and bit lines) of the set is coupled to a GIO. For example, the CS signal may selectively activate a switch (e.g., a transistor) which couples one of the sense amplifiers and bit lines of the set to the GIO. Multiple sets may receive a CS signal in common. For example, if the CS signal has a first value, then a first sense amplifier and its respective bit line in each sense amplifier set is coupled to that set's respective GIO, if the CS signal has a second value, then a second sense amplifier and its respective bit line in each sense amplifier set is coupled to the set's GIO and so forth.

Certain memory cells may be defective, and columns containing the defective memory cells may generally be referred to as defective columns (or bad columns or faulty columns). The memory may include one or more sets of redundant sense amplifiers, which are coupled to redundant bit lines and redundant memory cells which may be used for repair operation, such as global column redundancy (GCR) operations. As part of a GCR operation, a defective column address (e.g., which is associated with a particular value of the CS signal) is identified. Information, such as the column address, may be programmed into a fuse array and a redundancy control circuit remaps that column address to the redundant sense amplifier set (and the redundant bit lines and memory cells). Subsequently, when the address previously associated with the defective column is activated, the redundant column may be accessed instead.

The memory may be arranged into memory mats, with sense amplifiers positioned in the gaps (e.g., read/write gaps) between the mats. Each gap includes a redundant sense amplifier set which is coupled to redundant memory cells along redundant bit lines in both of the neighboring memory mats. When a bit line is repaired, the redundant sense amplifier set is activated, and one of the redundant sense amplifiers is selected (e.g., by the CS signal) and information along a redundant GIO is swapped onto the GIO associated with the repaired bit line. For example, information along the redundant CIO may replace the information which would otherwise appear along the GIO associated with the repaired bit line. Conventional memories, where the redundant GIO is enabled by the same signals as the regular sense amplifier sets, may only be able to repair one bit line for each value of CS in a gap. There may be a need to increase the flexibility of repair operations such that two repairs with the same CS value may be made in a gap.

The present disclosure is generally directed to apparatuses, systems, and methods for repairing multiple bit lines with a same column select value. A memory array is sub-divided into several memory mats, with sense amplifiers positioned in gaps between the mats. Each gap includes a number of sets of sense amplifiers and a redundant set of sense amplifiers. Each memory mat may have a first gap (e.g., an even gap) on a first side and a second gap (e.g., an odd gap) on an opposite side. An enable signal may activate the sense amplifiers of the sense amplifier sets of a gap. A column select signal may couple a sense amplifier in each sense amplifier set of the active gap in the set to a respective GIO line. The GIO line may be shared between corresponding sense amplifier sets in the even and odd gaps. For example, a first sense amplifier set in the odd gap and a first sense amplifier set in the even gap are both associated with a first GIO, and so forth.

The redundant sense amplifier set in a gap may be coupled to a redundant enable signal which is different than the enable signal coupled to one or more normal sense amplifier sets within that gap. Accordingly, the sense amplifiers in the redundant set may be activated separately from the sense amplifiers coupled to the normal memory region. In some embodiments, the redundant sense amplifier set may share a CS signal with the normal sense amplifier sets. In some embodiments, the redundant sense amplifier set may have a different CS signal (e.g., a redundant CS signal) which is not shared with the normal sense amplifier sets. The separate enable signals for the redundant sense amplifier sets may allow for increased flexibility in making repair operations, and may allow for repairs to be made both within a same gap and also allow for a bit line associated with a sense amplifier in the first gap to be repaired to a redundant bit line associated with a redundant sense amplifier in the second gap.

In a first example embodiment the memory mat is bordered by a first gap and a second gap, each of which has a respective plurality of sense amplifier sets and a respective redundant sense amplifier set. Each gap has a respective CS signal which selects a sense amplifier in each set and redundant set of that gap. For example, a first CS signal for the first gap and a second CS signal for the second gap. Each gap may also have enable signals for the plurality of sense amplifier sets and also a redundant enable signal for the redundant sense amplifier set in that gap. For example, a first and a second enable signal and a first and a second redundant enable signal. Each redundant sense amplifier set may have its own GIO line (e.g., a first redundant GIO and a second redundant GIO), while each sense amplifier set may share a GIO with a corresponding sense amplifier set in the opposite gap. During an example repair operation, a first column with a first CS value in a first sense amplifier set and a second sense amplifier set in the first gap are determined to be defective. The first redundant enable signal is activated and data along the first redundant GIO is swapped onto a first GIO associated with the first sense amplifier set. The second redundant enable signal is also activated, and the second CS signal is provided (not necessarily with the first value) and the data along the second redundant GIO is swapped onto a second GIO associated with the second sense amplifier set. Since the second redundant enable signal, but not the second enable signal are active, there is not a conflict of data along the shared GIOs. In this way both errors may be repaired.

In a second example embodiment, the memory mat is bordered by a first gap and a second gap, each of which has a respective plurality of sense amplifier sets and a respective redundant sense amplifier set. Each of the normal sense amplifier sets shares a GIO with a corresponding sense amplifier set in the other gap. Each normal sense amplifier set within a gap is coupled to a column select signal in common. The normal sense amplifiers are also coupled to an enable signal associated with that gap (e.g., a first enable signal for the sense amplifier sets of the first gap and a second enable signal for the sense amplifier sets of the second gap). The two redundant sense amplifier sets may each have their own GIO and CS signal (e.g., a first redundant CS signal and first redundant GIO and a second redundant CS signal and second redundant GIO). During an example repair operation, a first column with a first CS value in the first sense amplifier set in the first gap and a second column with the first CS value in a second sense amplifier set in the first gap may both be repaired. The first column may be repaired by providing the first redundant CS signal with the first value and accessing the redundant sense amplifier along the first redundant GIO, while the second column may be repaired by providing the second redundant CS signal with the first value and accessing the redundant sense amplifier along the second redundant GIO. The first redundant GIO may be swapped onto a first GIO associated with the first sense amplifier set and the second redundant GIO may be swapped onto a second GIO associated with the second sense amplifier set. In this way, both the first and second column may be repaired even though they have the same CS value and are in the same gap.

In a third example embodiment, the two redundant sense amplifier sets on opposite sides of the memory mat may share a common redundant GIO line, and multiple CS signals may be used for the normal sense amplifier sets in each gap. For example, a first even CS signal may be coupled to a first subset of sense amplifier sets in the even gap, a second even CS signal may be coupled to a second subset of sense amplifier sets in the even gap, and so forth. In an example repair operation, a first column with a first CS value in a sense amplifier set associated with the first even CS signal and a second column with the first CS value in a sense amplifier set associated with the second even CS signal both need repair. The repairs may both be made by remapping which bit lines are associated with which values of the first and the second even CS signals. For example, when an address is received, repair logic may remap it such that the first even CS signal has the first value, but the second even CS signal has a second value, activating a bit line which needs repair with the first even CS signal, but not activating the bit line which needs repair with the second even CS signal. This may 'swap' activated. CS signals such that after the remapping, the two bit lines which need repair are no longer associated with the same CS value, and thus the two repairs may both be made to the even redundant sense amplifier set.

A fourth example embodiment may be a combination of the second and the third embodiments, where the two redundant sense amplifier sets are coupled to separate GIOs from each other and also separate CS signals from the other sense amplifiers sets in their gaps, but also multiple CS signals are used in each gap. Accordingly, even more bit lines with a same CS signal within a gap may be repaired, both by remapping the value of the CS signal using the different CS signals within that gap and also by remapping to the redundant sense amplifier set of the other gap.

FIG. 1 is a block diagram of a semiconductor device according to at least some embodiment of the disclosure. The semiconductor device 100 may be a semiconductor memory device, such as a DRAM device integrated on a single semiconductor chip.

The semiconductor device 100 includes a memory array 118. The memory array 118 is shown as including a plurality of memory banks. In the embodiment of FIG. 1, the memory array 118 is shown as including eight memory banks BANK0-BANK7. More or fewer banks may be included in the memory array 118 of other embodiments. Each memory bank includes a plurality of word lines WL, a plurality of bit lines BL and /BL, and a plurality of memory cells MC arranged at intersections of the plurality of word lines WL and the plurality of bit lines BL and /BL. The selection of which word line WI, is active is performed by a row decoder 108 and the selection of which of the bit lines BL and is coupled to a global input/output (GIO) line is performed by a column decoder 110.

In the embodiment of FIG. 1, the row decoder 108 includes a respective row decoder for each memory bank and the column decoder 110 includes a respective column decoder for each memory bank. The bit lines BL is coupled to a respective sense amplifier (SAMP) along with a bit line/BL which may be used as a reference during the sensing operation. Read data from the bit line BL is amplified by the sense amplifier SAW, and transferred to read/write amplifiers 120 over local data lines (LIO), to a transfer gate TB, which couples the LIO to a GIO based on a column select (CS) signal from the column decoder 110. Conversely, write data outputted from the read/write amplifiers 120 is transferred to the sense amplifier SAMP over the GIO, TG, and LIO, and written in the memory cell MC coupled to the bit line BL.

The device also includes a fuse array 125, which contains a plurality of non-volatile storage elements (fuses or anti-fuses) which may store information about addresses in the memory array 118. Each fuse may start in a first state (e.g., an anti-fuse may be insulating), and may be 'blown' to permanently change the fuse's state (e.g., a blown anti-fuse may be conductive). For ease of reference, the term 'fuse' may be used to refer to any non-volatile storage element. Each fuse may be considered to be a bit, which is in one state before it is blown, and permanently in a second state after it's blown. For example, a fuse may represent a logical low before it is blown and a logical high after it is blown.

Groups of fuses may store a binary signal which may be used to control and/or alter operations of the memory. For example, the fuse array 125 includes repair information which may be used to perform repair operations. For example, the fuse array may include sets of information related to repair operations. Each set may encode a repair address which specify bit line (or set of bit lines) to be repaired, for example by programming in a column address associated with a defective memory cell.

The address information in the fuse array 125 may be 'scanned' out along a fuse bus (FB) to a redundancy control circuit 126. While shown as a separate component in FIG. 1, the redundancy control 126 may be part, of the row decoder 108 and/or column decoder 110 in some embodiments. The redundancy control circuit 126 may receive the column address YADD of a column which is being accessed. If the column address YADD matches a repair address, then the redundancy control circuit 126 may direct the column decoder 110 to access a redundant column rather than the column originally associated with the address YADD. For example, if the column address YADD would normally be associated with a first value of the CS signal, the redundancy control circuit 126 may direct the column decoder 110 to activate a redundant CS signal which couples a redundant sense amplifier (and its associated redundant memory cell) to the a redundant GIO line. The repair logic may direct the IO circuit 122 to access the redundant GIO line instead of the GIO line associated with the column address which was repaired.

The semiconductor device 100 may employ a plurality of external terminals that include command and address (C/A) terminals coupled to a command and address bus to receive commands and addresses, clock terminals to receive clocks CK and /CK, data terminals DQ to provide data, and power supply terminals to receive power supply potentials VDD, VSS, VDDQ, and VSSQ.

The clock terminals are supplied with external clocks CK and /CK that are provided to an input circuit 112. The external clocks may be complementary. The input circuit 112 generates an internal clock ICLK based on the CK and /CK clocks. The ICLK clock is provided to the command decoder 106 and to an internal clock generator 114. The internal clock generator 114 provides various internal clocks LCLK based on the ICLK clock. The LCLK clocks may be used for timing operation of various internal circuits. The internal data clocks LCLK are provided to the input/output circuit 122 to time operation of circuits included in the input/output circuit 122, for example, to data receivers to time the receipt of write data.

The C/A terminals may be supplied with memory addresses. The memory addresses supplied to the C/A terminals are transferred, via a command/address input circuit 102, to an address decoder 104. The address decoder 104 receives the address and supplies a row address XADD to the row decoder 108 and supplies column address YADD to the column decoder 110 and to the redundancy control circuit 126. The address decoder 104 may also supply a decoded bank address BADD, which may indicate the bank of the memory array 118 containing the row address XADD and column address YADD. The C/A terminals may be supplied with commands. Examples of commands include timing commands for controlling the timing of various operations, access commands for accessing the memory, such as read commands for performing read operations and write commands for performing write operations, as well as other commands and operations. The access commands may be associated with one or more row address XADD, column address YADD, and bank address BADD to indicate the memory cell(s) to be accessed.

The commands may be provided as internal command signals to a command decoder 106 via the command/address input circuit 102. The command decoder 106 includes circuits to decode the internal command signals to generate various internal signals and commands for performing operations. For example, the command decoder 106 may provide a row command signal to select a word line and a column command signal to select a bit line.

The device 100 may receive an access command which is a read command. When a read command is received, a bank address BADD and a column address YADD are timely supplied with the read command, read data is read from memory cells in the memory array 118 corresponding to the row address XADD and column address YADD. For example, the row decoder 108 may access the wordline associated with the row address XADD (unless the row address has been repaired, in which case redundant word lines may be accessed instead). The read command is received by the command decoder 106, which provides internal commands so that read data from the memory array 118 is provided to the read/write amplifiers 120. The column decoder 110 may activate a CS signal to access the bit lines) associated with YADD by selecting which TG's are active to couple the LIO to the GIO, If the redundancy control circuit 126 determines that the column address YADD was repaired, then CS signals may be activated which cause redundant memory cells to be coupled to a redundant GIO. The data on the redundant GIO may be swapped into a signal to replace the data which would otherwise have come from the defective memory cell. For example, a multiplexer may be used to swap the information. In some embodiments, the swap may occur at the output of the GIO circuitry. For example, the sensed GIO data along the redundant GIO may be swapped with the sensed GIO data from the defective memory cell at the GIO circuitry during a read operation. The read data is output to outside from the data terminals DQ via the input/output circuit 122.

The device 100 may receive an access command which is a write command. When the write command is received, a bank address BADD and a column address YAM are timely supplied with the write command, write data supplied to the data terminals DQ is written to a memory cells in the memory array 118 corresponding to the row address and column address. The write command is received by the command decoder 106, which provides internal commands so that the write data is received by data receivers in the input/output circuit 122. Write clocks may also be provided to the external clock terminals for timing the receipt of the write data by the data receivers of the input/output circuit 122. The column decoder 110 may activate a column select CS signal to access bit lines corresponding to YADD. If the column address YADD matches with an address in the redundancy control circuit 126 (e.g., stored in the fuse array 125), then redundant columns may be activated instead. The write data is supplied via the input/output circuit 122 to the read/write amplifiers 120, and by the read/write amplifiers 120 to the memory array 118 to be written into the memory cell MC.

The device 100 may also receive commands causing it to carry out an auto-refresh operation. The refresh signal AREF may be a pulse signal which is activated when the command decoder 106 receives a signal which indicates an auto-refresh command. In some embodiments, the auto-refresh command may be externally issued to the memory device 100. In some embodiments, the auto-refresh command may be periodically generated by a component of the device. In some embodiments, when an external signal indicates a self-refresh entry command, the refresh signal AREF may also be activated. The refresh signal AREF may be activated once immediately after command input, and thereafter may be cyclically activated at desired internal timing. Thus, refresh operations may continue automatically. A self-refresh exit command may cause the automatic activation of the refresh signal AREF to stop and return to an IDLE state.

The refresh signal AREF is supplied to the refresh address control circuit 116. The refresh address control circuit 116 supplies a refresh row address RXADD to the row decoder 108, which may refresh a wordline WL indicated by the refresh row address RXADD. The refresh address control circuit 116 may control a timing of the refresh operation, and may generate and provide the refresh address RXADD. The refresh address control circuit 116 may be controlled to change details of the refreshing address RXADD (e.g., how the refresh address is calculated, the timing of the refresh addresses), or may operate based on internal logic. In some embodiments, the refresh address control circuit 116 may perform both auto-refresh operations, where the wordlines of the memory array 118 are refreshed in a sequence, and targeted refresh operations, where specific wordlines of the memory are targeted for a refresh out of sequence from the auto-refresh operations.

The power supply terminals are supplied with power supply potentials VDD and VSS. The power supply potentials VDD and VSS are supplied to an internal voltage generator circuit 124. The internal voltage generator circuit 124 generates various internal potentials VPP, VOD, VARY, VPERI, and the like based on the power supply potentials VDD and VSS supplied to the power supply terminals. The internal potential VPP is mainly used in the row decoder 108, the internal potentials VOD and VARY are mainly used in the sense amplifiers SAMP included in the memory array 118, and the internal potential VPERI is used in many peripheral circuit blocks.

The power supply terminals are also supplied with power supply potentials VDDQ and VSSQ. The power supply potentials VDDQ and VSSQ are supplied to the input/output circuit 122. The power supply potentials VDDQ and VSSQ supplied to the power supply terminals may be the same potentials as the power supply potentials VDD and VSS supplied to the power supply terminals in an embodiment of the disclosure. The power supply potentials VDDQ and VSSQ supplied to the power supply terminals may be different potentials from the power supply potentials VDD and VSS supplied to the power supply terminals in another embodiment of the disclosure. The power supply potentials VDDQ and VSSQ supplied to the power supply terminals are used for the input/output circuit 122 so that power supply noise generated by the input/output circuit 122 does not propagate to the other circuit blocks.

Figure 2:
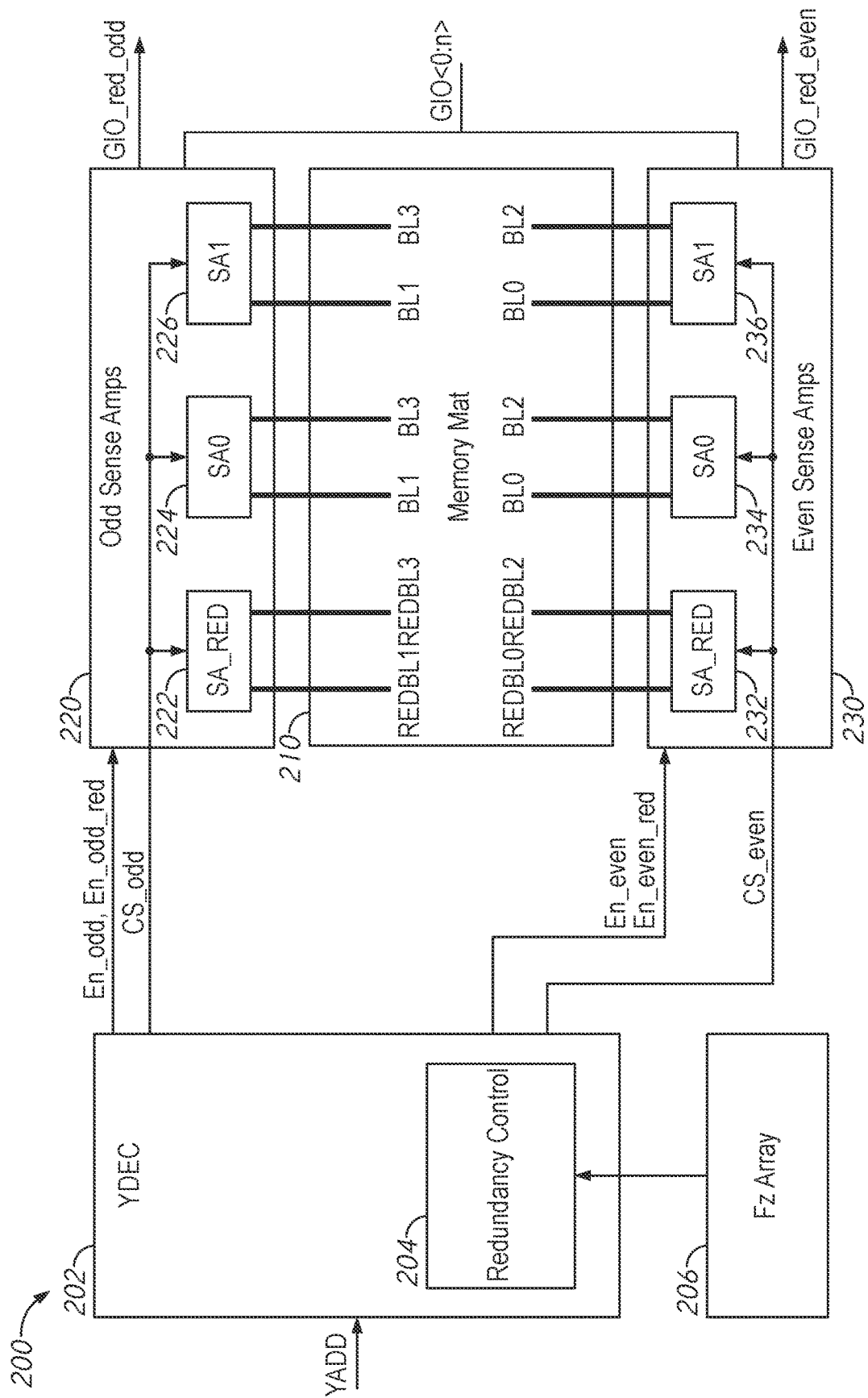
FIG. 2 is a block diagram of repair logic according to some embodiments of the present disclosure.

FIG. 2 is a block diagram of repair logic according to some embodiments of the present disclosure. The repair logic 200 may represent a portion of a memory device, such as the memory device 100 of FIG. 1. The repair logic may represent a simplified view which shows various components useful to explaining example repair operations.

The repair logic 200 includes a column decoder 202 (e.g., 110 of FIG. 1) as well as a redundancy control circuit 204 (e.g., 126 of FIG. 1) and fuse array e.g., 125 of FIG. 1). The column decoder 202 receives a column address YADD and provides column select signals to selectively activate one or more columns by coupling them to GIO lines. Although not shown in FIG. 2, a row decoder (e.g., 108 of FIG. 1) receives a row address and activates the memory cells along a word line which intersects the columns. A memory mat 210, which may be a portion of memory array 118 of FIG. 1, is shown, along with its two adjacent sense amplifier regions 220 and 230. The sense amplifier regions 220 and 230 each include a number of sense amplifier sets (e.g., 222-226 and 232-236) which each include a number of sense amplifiers coupled to respective bit lines of the memory mat 210. For the sake of clarity, only two bit lines per sense amplifier group are shown, and the individual sense amplifiers are not depicted. However, it should be understood that each sense amplifier set may have multiple sense amplifiers each coupled to a bit line. For example, each sense amplifier set may include 16 sense amplifier set (each coupled to one of 16 bit lines in the memory mat 210). More or fewer sense amplifiers per sense amplifier set may be used in other example embodiments.

The memory mat 210 includes a number of memory cells (not shown) at the intersection of word lines (not shown) and bit lines. When a word line in the mat 210 is accessed (e.g., responsive to an activation signal ACT and a row address XADD) by the row decoder, the memory cells along that word line are coupled to the bit lines. Based on which enable signals (e.g., En_odd, En_even) are active, the memory cells coupled to different sense amplifier sets may be selected. For example, the En_odd signal may select the sense amplifier sets 224 and 226, while the signal En_even may select the sense amplifier sets 234 and 236. The redundant sense amplifier sets 222 and 232 are separately enabled by signals En_odd_red and En_even_red respectively. Based on the value of the CS signals provided to the even and odd groups, a sense amplifier and bit line in each set may be selected and coupled to a corresponding GIO line. For example, a first CS signal CS_odd selects a sense amplifier and bit line in each of the sense amplifier sets 222, 224 and 226, while a second CS signal CS_even selects a sense amplifier and bit line in each of the sense amplifier sets 232, 234, and 236. Accordingly, based on the value(s) of the CS signal(s) provided column decoder 202 as well as which of the enable signals are active, one or more bit lines are coupled to GIO lines, which couple information to or from the memory cells.

The sense amplifiers may be arranged in sense amplifier regions, such as 220 and 230, which are positioned between memory mats. For example, each memory mat may be bordered by two sense amplifier regions (e.g., an even region and an odd region), and each sense amplifier region may be bordered by two memory mats. The sense amplifier regions may be positioned in gaps, such as read/mite gaps, between the memory mats. Each sense amplifier may be coupled to a bit line in both of the neighboring mats. During a given access operation one bit line may be used to read or write data (e.g., to an active mat) and the other may be used as a reference for the operation of the sense amplifier. For example, the sense amplifiers in an odd gap region 220 may be coupled to odd bit lines in both a first and second memory mat, while the sense amplifiers in an even gap region 230 may be coupled to even bit lines in the second and a third memory mat. Only the bit lines extending into the example active mat 210 (e.g., the mat where a word line is activated) are shown in the view of FIG. 2.

Since the sense amplifier regions 220 and 230 may generally be similar, for the sake of brevity, only sense amplifier region 220 is described in detail herein. The sense amplifier region 220 includes a first set of sense amplifiers SA0 226 and a second set of sense amplifiers SA1 224. Each set of sense amplifiers includes a number of individual sense amplifiers, each coupled to a respective bit line (and a reference bit line in an adjacent mat, not shown). For the sake of simplifying the drawing, each sense amplifier set is shown as coupled to two bit lines, and so each set 226 and 224 would include two sense amplifiers. The odd sense amplifier region 220 also includes a redundant set of sense amplifiers 222, which are coupled to redundant bit lines, through those to redundant memory cells. The redundant memory cells may be used for repair operations. The even sense amplifier region 230 is similar, with 'normal' sense amplifier sets 234 and 236, and redundant sense amplifier set 232.

The sense amplifier regions 220 and 230 may receive enable signals such as En_odd and En_even. The signals En_odd and En_even may represent one or more signals which are active based, in part, on the commands received by the command decoder. For example, En_odd may include a write enable signal to enable write operations and a read enable signal to enable read operations. The normal sense amplifiers of a given region may all be selected together when the enable signal for that region is active. Which of the selected sense amplifiers is coupled to the GIO line is controlled by the value of a CS signal, as described in more detail herein. The redundant sense amplifier sets 222 and 232 may each have their own enable signals. For example, the redundant sense amplifier set 222 is controlled by a signal En_odd_red which is separate from En_odd, and the redundant sense amplifier set 232 is controlled by a signal En_even_red which is separate from En_even. Whether the redundant enable signals En_odd_red and En_even_red are selected or not for a given access operation may be controlled by the redundancy control 204. In this manner, the redundant sense amplifier sets 222 and 232 may only be selected when a repair operation has been performed which uses that sense amplifier set.

The sense amplifier sets in the two regions 220 and 230 may each receive a column select signal CS. In the embodiment shown in FIG. 2, separate CS signals, CS_odd and CS_even are shown for the regions 220 and 230 respectively. For example, sense amplifier sets 224 and 226 receive CS_odd and the sense amplifier sets 234 and 236 receive a signal CS_even. The CS signals may be multi-bit signals, where a value of the CS signal (e.g., which bit is active) determines which sense amplifier within the sets are coupled to a respective GIO line. In some embodiments, the two CS signals CS_odd and CS_even may be considered as separate portions of a larger multi-bit CS signal. For example, CS may be CS<0:n−1> and CS_even may be CS<n:m>. In some embodiments, a single CS signal may be provided to both regions.

The value of the signal CS may be determined, in part, on the column address YADD. The enable signals En_odd and En_even may control which sense amplifier region 220 and 230 is active, while the value of the CS signal controls which sense amplifier within each of the sense amplifier sets of the active region is coupled to the GIO line. For example, a first value of CS_odd may couple both BL0 in sense amplifier set 224 and in sense amplifier set 226 to a first GIO and a second GIO line respectively when the odd enable signal En_odd is active. The GIO lines may be shared with the sense amplifier sets in the other region. So a first value of CS_even may couple BL1 in sense amplifier set 234 to the first GIO and BL1 in sense amplifier set 236 to the second GIO when the even enable signal En_even is active.

The redundant sense amplifier sets 222 and 232 may share a CS signal with the 'normal' sense amplifier sets in their respective regions. In other words, the redundant sense amplifier set 222 may be coupled to CS_odd and the redundant sense amplifier set 232 may be coupled to CS_even. Since, the signals En_odd_red and En_even_red may be independent from En_odd and En_even respectively, and do not necessarily have the same value, the redundant sense amplifier sets 222 and 232 may be separately enabled from the other sense amplifiers in their region. For example, En_even_red may be active even when En_even is not. This may allow for increased flexibility of repair operations.

In some embodiments, each of the redundant sense amplifier sets 222 and 232 may be coupled to a different GIO line. For example, redundant sense amplifiers 222 are coupled to GIO_red_odd and redundant sense amplifiers 232 are coupled to GIO_red_even. In some example embodiments, the two redundant sense amplifier sets 222 and 232 may share a redundant GIO line. In some embodiments, there may be further subdivisions of the CS signals. For example a first CS_odd signal coupled to the first sense amplifier set 224, a second CS_odd signal coupled to the second sense amplifier set 226 and so forth. In some embodiments, there may be a common CS signal shared between normal sense amplifier sets of the two regions, and a common redundant CS signal shared between the redundant sense amplifier sets 222 and 232.

In an example repair operation, testing may determine that both BL1 associated with SA set 0 (SA0) 224 and BL1 associated with SA set 1 (SA1) 226 are defective and require repair. Accordingly, information may be programmed in the fuse array 206 to effect the repair. During an access operation, when a column address YADD calls for BL1 to be provided along CS_odd to this memory mat 210, the redundancy control 204 may instruct to column decoder 202 to provide CS_odd with a value associated with a first value (e.g., REDBL1 in 222 and REDL0 in 232) provide CS_even with the some value (for the sake of this example, it may also be the first value) and provide the enable signals En_odd, En_odd_red, and En_even_red as active. Accordingly, the redundant sense amplifier sets 222 and 232 may both be enabled, and may couple GIO_red_odd to REDBL1 and GIO_red_even to REDBL0. The two redundant GIO's may be swapped onto the GIOs where data is expected (e.g., onto GIO<0> and GIO<1>). While only two sense amplifier sets were shown in FIG. 2, enabling En_odd allows the other sense amplifier sets in the region 220 which were not repaired to function as normal, filling out the other bits of GIO (e.g., GIO<2:n>). In this manner two repairs, of two different bit lines both associated with a same CS value in a same region may be effected.

Different example arrangements of signals and repair operations are described in more detail in FIGS. 3-10.

Figure 9:
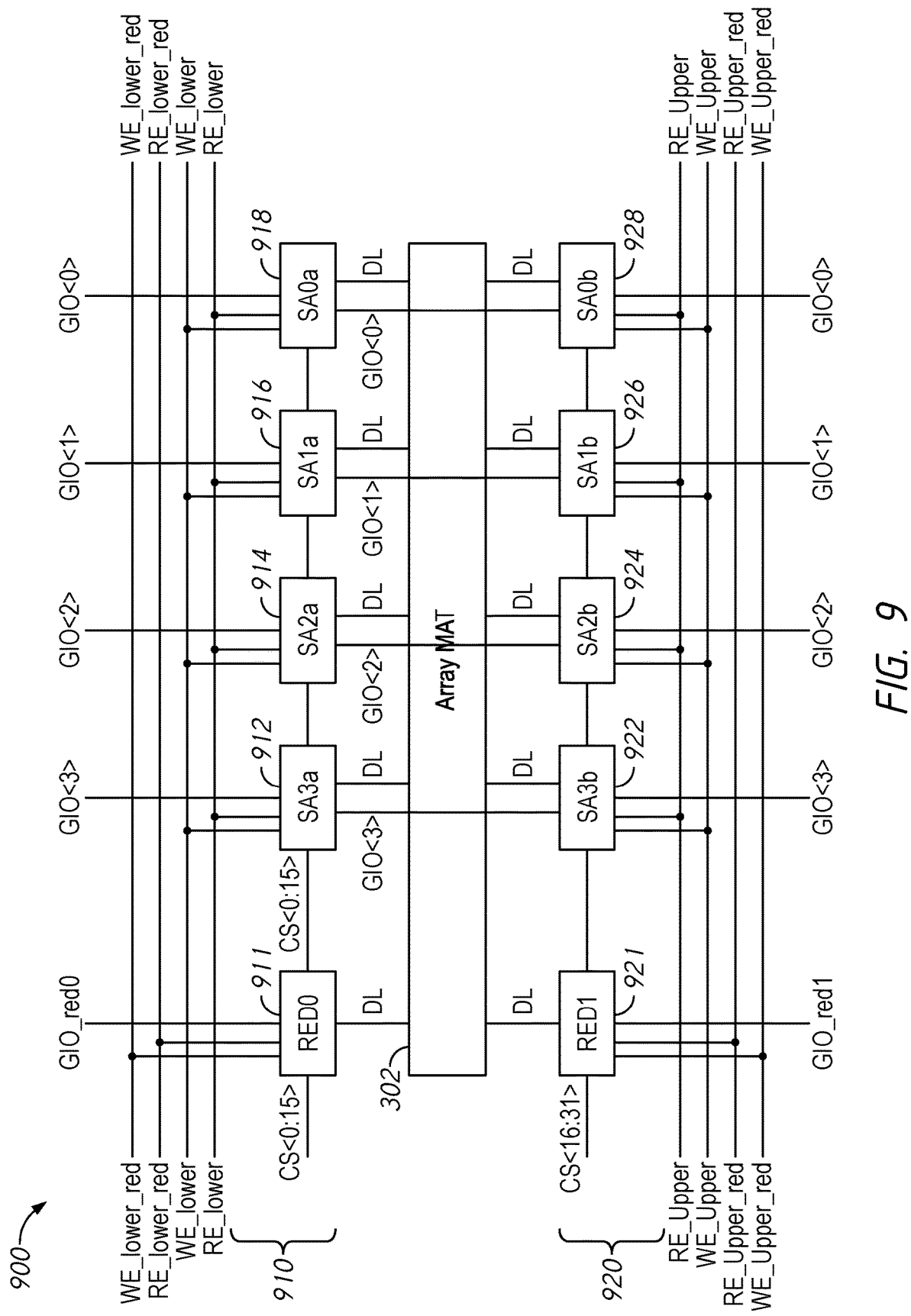
FIG. 9 is a schematic diagram of a portion of a memory array according to some embodiments of the present disclosure.

FIG. 9 is a schematic diagram of a portion of a memory array according to some embodiments of the present disclosure. The portion 900 may, in some embodiments, represent a portion of the memory array 118 of FIG. 1. The portion 900 shows a memory mat 902 along with sense amplifiers in the adjacent gaps 910 and 920. The mat 902 and gaps 910 and 920 may, in some example embodiments, be an implementation of mat 210 and regions 220 and 230 of FIG. 2. Each gap 910 and 920 includes sense amplifier sets 912-918 and 922-928 as well as redundant sets 911 and 921.

Figure 3:
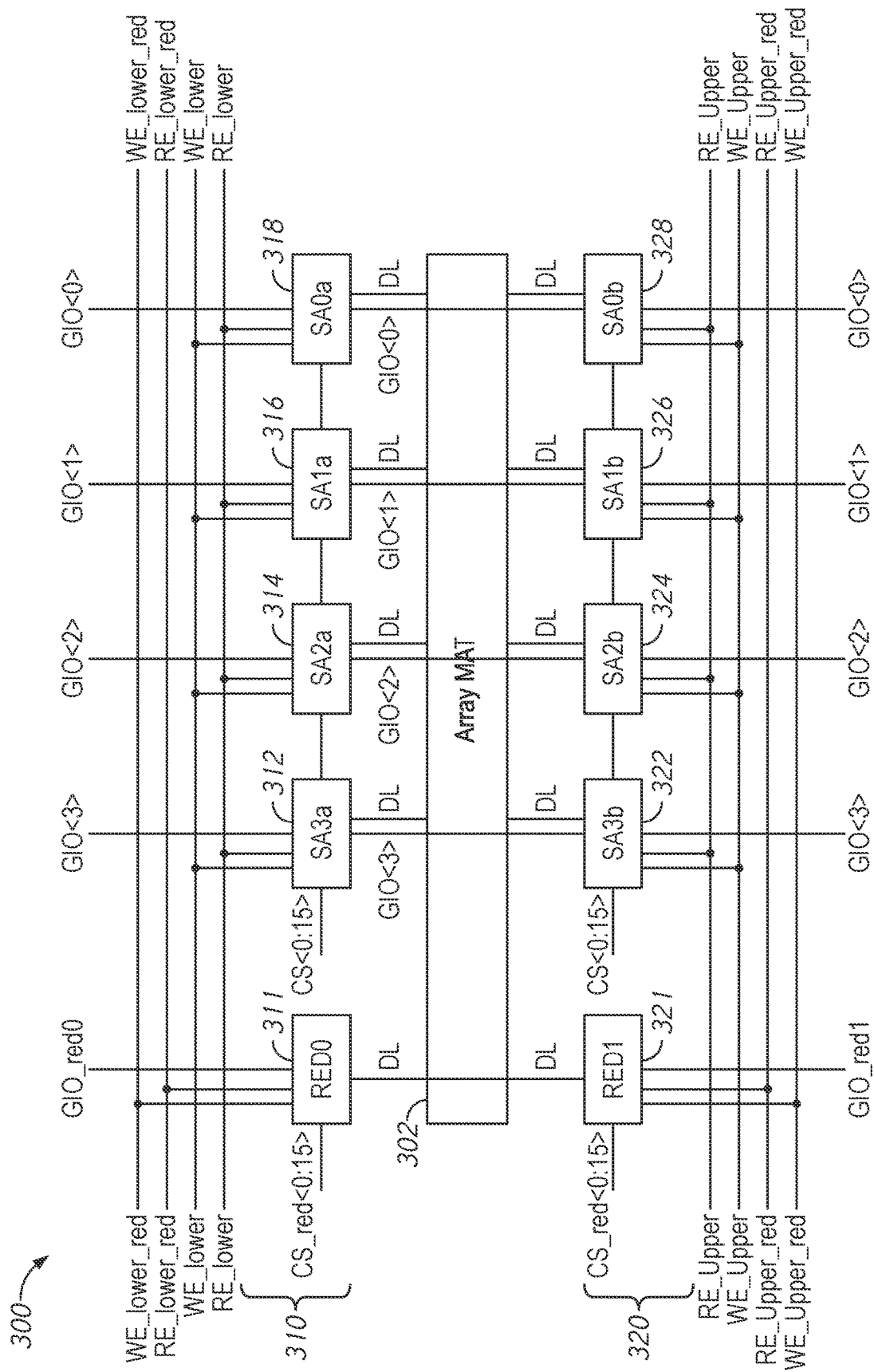
FIG. 3 is a schematic of a portion of a memory array according to some embodiments of the present disclosure.

In the example embodiment of FIG. 9, each sense amplifier set 911-918 and 921-928 includes sixteen sense amplifiers. Accordingly, the CS signals in each gap are sixteen bit signals CS<0:15> (e.g., CS_odd of FIG. 2) and CS<16:31> (e.g., CS_even of FIG. 2), with each bit of the CS signals associated with one of the sense amplifiers in each of the sense amplifier sets. More or fewer sense amplifiers per set and more or fewer bits of the CS signals may be used in other examples. While only eight 'normal' sense amplifier sets 912-918 and 922-928 (e.g., four in each gap) are shown in FIG. 3, it should be understood that more or fewer sense amplifier sets may be used in other example embodiments.

In the example embodiment of FIG. 9, the terms 'lower' and 'upper' rather than 'even' and 'odd' are used to distinguish between the two gaps 910 and 920. Terms such as lower, upper, even, and odd should be understood as labels for the different gaps and should not be interpreted as requiring any particular relationship between the gaps such as a spatial or numerical relationship.

In the example embodiment of FIG. 9, the 'normal' sense amplifier sets 912-918 of the lower gap 910 are activated by enable signals such as write enable signal WE_lower and read enable signal RE_lower, while the redundant sense amplifier set 911 is enabled by redundant write enable signal WE_lower_red and redundant read enable signal RE_lower_red (e.g., which may be part of En_odd and En_odd_red of FIG. 2). Similarly, the 'normal' sense amplifier sets 922-928 of the upper gap 920 are activated by enable signals such as write enable signal WE_upper and read enable signal RE_upper, while the redundant sense amplifier set 921 is enabled by redundant write enable signal WE_upper_red redundant read enable signal RE_upper_red (e.g., which may be part of En_upper and En_upper_red of FIG. 2).

In the first gap 910, the normal sense amplifiers 912-918 and the redundant sense amplifier set 911 receive a first column select signal CS<0:15> in common. In the second gap 920, the normal sense amplifiers 922-928 and the redundant sense amplifier 921 receive a second column select signal CS<16:31> in common. The normal sense amplifier sets 912-918 and 922-928 are coupled to a signal line of GIO in common with a corresponding sense amplifier set in the opposite gap. So, for example, the sense amplifier sets 918 and 928 are both coupled to GIO<0>, sets 916 and 926 are both coupled to GIO<1>, 914 and 924 to GIO<2>, and 912 and 922 to GIO<3>. Meanwhile, the redundant sense amplifier sets have their own GIO lines, such that redundant set 911 is coupled to a first redundant GIO GIO_red0, and redundant set 921 is coupled to a second redundant GIO GIO_red1.

In an example normal read operation (e.g., where no repairs have been performed), the signal RE_lower may be activated, which in turn may select all the sense amplifiers in the sets 912-918. Based on a column address, the CS<0: 15> signal may be provided with a value such that a third bit of CS is active. Accordingly, a third sense amplifier in each of the sets 912 to 918 may be coupled to the respective GIO line and data may be read out along GIO<0> to GIO<3>.

In an example repair situation, testing may have determined that the there is a fault in GIO<3> and GIO<1> when the second bit of CS_lower is active and an access is performed on the lower gap 910 of this memory mat 302, and the fuse array may be programmed accordingly. In other words the testing may determine that a second bit line associated with sense amplifier set 912 and a second bit line associated with sense amplifier set 916, both associated with a same CS<0:15> value, need to be repaired. After the repair, during an example read operation, the memory may provide CS<0:15> with the second bit active along with RE_lower active. The memory also provides CS<16:31> with the second bit active along with RE_lower_red and RE_upper_red active. Accordingly, GIO<0> and GIO<2> may read out as normal from the second bit lines of sense amplifier set 918 and 914 respectively. The two redundant sense amplifier sets may also be activated, and the second bit line of each of those two sets may be read out onto GIO_red0 and GIO_red1 respectively. The values along GIO_red0 and GIO_red1 may then be swapped onto GIO<1> and GIO<3> such that the overall output GIO<0:3> includes information from the redundant bit lines associated with redundant sense amplifier set 911 and 921 rather than the information from the sense amplifier sets 916 and 912.

For the sake of simplicity, in this example, the redundant bit lines activated in both redundant sense amplifier sets 911 and 921 are the same. However, it should be appreciated that any of the bit lines may be selected in the redundant sense amplifier set which is opposite the gap where the defects are detected. In other words, CS<16:31> may have any value, it does not need to have the same value of CS<0:15>.

Figure 10:
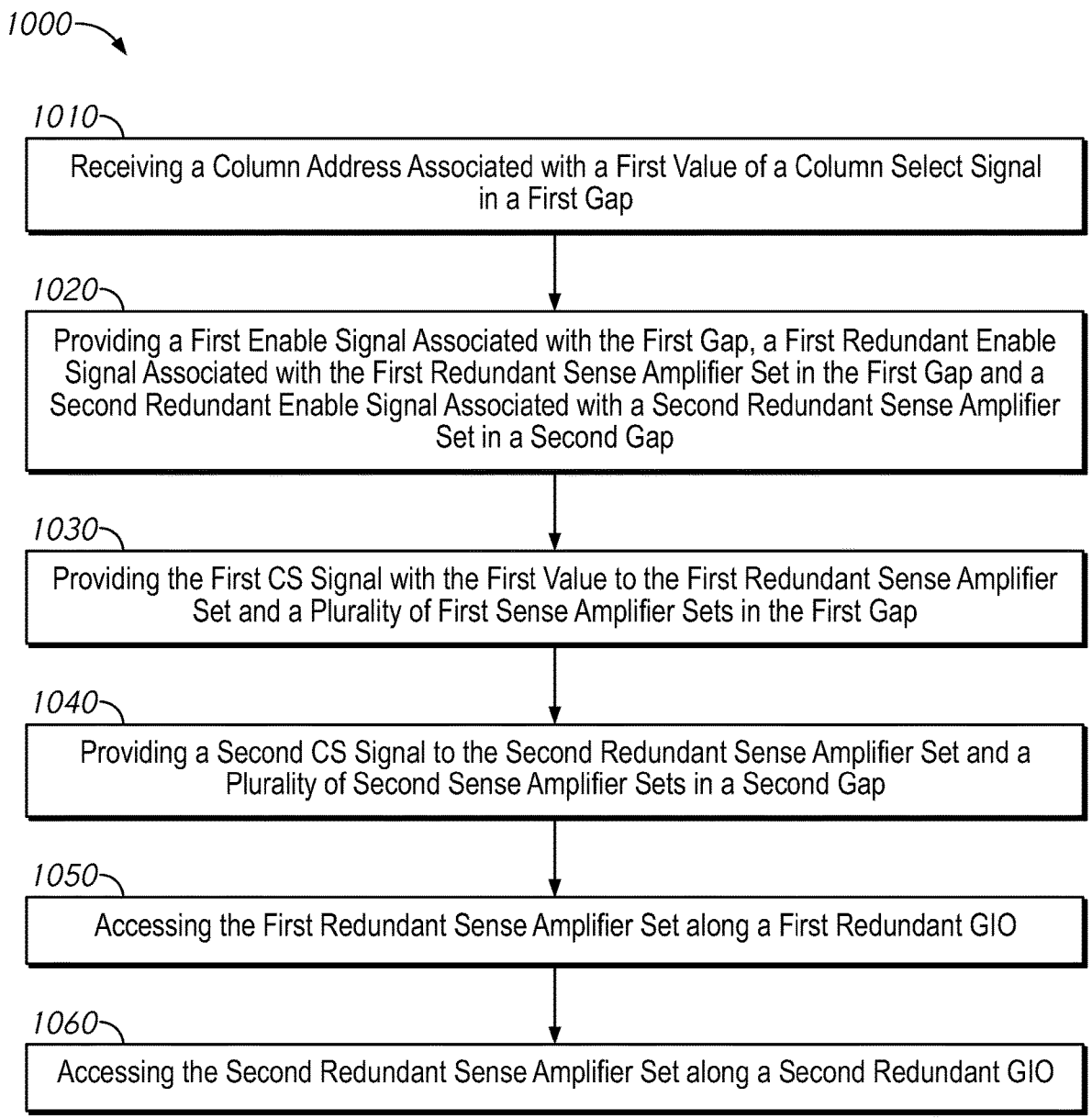
FIG. 10 is a flow chart of a method according to some embodiments of the present disclosure.

FIG. 10 is a flow chart of a method according to some embodiments of the present disclosure. The method 1000 may, in some embodiments, be implemented by the one or more of the apparatuses or systems described herein. For example, the method 1000 may be implemented by the memory array portion 900 of FIG. 9.

The method 1000 includes box 1010, which describes receiving a column address associated with a first value of a first column select signal in a first gap. For example, a based on signals received on a C/A terminal (e.g., from a controller of the memory), an address decoder (e.g., 104 of FIG. 1) may provide row, bank, and column addresses while a command decoder e.g., 106 of FIG. 1) may provide access commands. The row and bank addresses may indicate a particular mat of a memory array (e.g., mat 910 of FIG. 9), while the column address may indicate which bit lines should be accessed. A column decoder 110) may generate the first column select signal (e.g., CS<0:15> of FIG. 9) with a value (e.g., which bit of the CS signal is active) based on the column address.

Block 1020 describes providing a first enable signal associated with the first gap, a first redundant enable signal associated with a first redundant sense amplifier set in the first gap and a second redundant enable signal associated with a second redundant sense amplifier set in a second gap. For example, as part of a read operation, the signals RE_lower, RE_lower_red, and RE_upper_red of FIG. 9 may all be active.

Block 1030 describes providing the first CS signal with the first value to the first redundant sense amplifier set and to a plurality of first sense amplifier sets in the first gap. The redundant sense amplifier sets may be coupled to redundant bit lines (and to redundant memory cells) in the memory mat. The first CS signal may cause a bit line associated with the first value in the first redundant sense amplifier set and each of the plurality of first sense amplifier sets to be coupled to a respective GIO line.

Block 1030 may be followed by block 1040, which describes providing a second CS signal to the second redundant sense amplifier set and a plurality of second sense amplifier sets in the second gap. For example, the signal CS<16:31> may also be provided. In some embodiments, the first and the second CS signals may both have the same value (e.g., a first bit of CS<0:15> and a first bit of CS<16:31> may both be active). In some embodiments, the first and the second CS signals may have different values from each other.

Block 1040 may be followed by block 1050 and 1060, which describe accessing the first redundant sense amplifier set along a first redundant GIO and accessing the second redundant sense amplifier set along a second redundant GIO respectively. For example, the method 1000 may include activating the sense amplifiers of the first redundant sense amplifier set responsive to the first redundant enable signal and coupling a first redundant bit line and first redundant sense amplifier to the first redundant GIO responsive to the first value of the first CS signal. The method 1000 may also include activating the sense amplifiers of the second redundant sense amplifier set responsive to the second redundant enable signal and coupling a redundant bit line and redundant sense amplifier to the second redundant GIO responsive to the value of the second CS signal.

The method 1000 may include multiplexing a value of the first redundant GIO to a first GIO signal line and multiplexing a value of the second redundant GIO to a second GIO signal line. The first and the second GIO signal lines may be based on which sense amplifier sets include the bit lines which were identified as defective.

The method 1000 may include determining if the column address has been repaired. For example, the method 1000 may include comparing the column address to a repaired column address with redundancy logic (e.g., 204 of FIG. 2). The repaired column address may be stored in a fuse array (e.g., 125 of FIG. 1). If the column address matches the repaired column address, then the method may continue to block 1020. If the column address was not repaired, then the method 1000 may include providing a first enable signal, but not the first or the second redundant enable signal.

While the steps of the method 1000 may generally be shown as a sequence, with one block following another, it should be understood that the steps may represent operations within a memory which may have different timing from what is shown. For example, the enable signals described in block 1030 may be provided before the CS signals or may be provided approximately simultaneously with the CS signals. Similarly, the steps of blocks 1050 and 1060 may occur at the same time in some embodiments.

FIG. 3 is a schematic of a portion of a memory array according to some embodiments of the present disclosure. The portion 300 may, in some embodiments, represent a portion of the memory array 118 of FIG. 1. The portion 300 shows a memory mat 302 along with sense amplifiers in the adjacent gaps 310 and 320, The mat 302 and gaps 310 and 320 may, in some example embodiments, be an implementation of mat 210 and regions 220 and 230 of FIG. 2. Each gap 310 and 320 includes sense amplifier sets 312-318 and 322-328 as well as redundant sets 311 and 321.

In the example embodiment of FIG. 3, each sense amplifier set 311-318 and 321-528 includes sixteen sense amplifiers. Accordingly, the CS signals CS and CS_red are sixteen bit signals, with each bit associated with one of the sense amplifiers in each of the sense amplifier sets. More or fewer sense amplifiers per set and more or fewer bits of the CS signals may be used in other examples. While only eight 'normal' sense amplifier sets (e.g., four in each gap) are shown in FIG. 3, it should be understood that more or fewer sense amplifier sets may be used in other example embodiments.

In the example embodiment of FIG. 3, the terms 'lower' and 'upper' rather than 'even' and 'odd' are used to distinguish between the two gaps 310 and 320. Terms such as lower, upper, even, and odd should be understood as labels for the different gaps and should not be interpreted as requiring any particular relationship between the gaps such as a spatial or numerical relationship.

In the example embodiment of FIG. 3, the 'normal' sense amplifier sets 312-318 of the lower gap 310 are activated by enable signals such as write enable signal WE_lower and read enable signal RE_lower, while the redundant sense amplifier set 311 is enabled by redundant write enable signal WE_lower_red and redundant read enable signal RE_lower_red (e.g., which may be part of En_odd and En_odd_red of FIG. 2). Similarly, the 'normal' sense amplifier sets 322-328 of the upper gap 320 are activated by enable signals such as write enable signal WE tipper and read enable signal RE_upper, while the redundant sense amplifier set 321 is enabled by redundant write enable signal WE_upper_red and redundant read enable signal RE_upper_red (e.g., which may be part of En_upper and En_upper_red of FIG. 2).

The normal sense amplifiers 312-318 and 322-328 receive a column select signal CS in common. The redundant sense amplifier sets 311 and 321 receive a redundant sense amplifier signal CS_red in common. The normal sense amplifier sets 312-318 and 322-328 are coupled to a signal line of GIO in common with a corresponding sense amplifier set in the opposite gap. So, for example, the sense amplifier sets 318 and 328 are both coupled to GIO<0>, sets 316 and 326 are both coupled to GIO<1>, 314 and 324 to GIO<2>, and 312 and 322 to GIO<3>. Meanwhile, the redundant sense amplifier sets have their own GO lines, such that redundant set 311 is coupled to GIO_red0, and redundant set 321 is coupled to GIO_red1.

In an example normal read operation (e.g., where no repairs have been performed), the signal RE_lower may be activated, which in turn may activate all the sense amplifiers in the sets 312-318. Based on a column address, the CS signal may be provided with a value such that a third bit of CS is active. Accordingly, a third sense amplifier in each of the sets 312 to 318 may be coupled to the respective GIO line and data may be read out along GIO<0> to GIO<3>.

In an example repair situation, testing may have determined that the there is a fault in GIO<3> and GIO<1> when the second bit of CS is active and an access is performed on the lower gap 310 of this memory mat 302, and the fuse array may be programmed accordingly. In other words the testing may determine that a second bit line associated with sense amplifier set 312 and a second bit line associated with sense amplifier set 316, both associated with a same CS value, need to be repaired. After the repair, during an example read operation, the memory may provide CS with the second bit active along with RE_lower active. The memory also provides CS_red with the second bit active along with RE_lower_red and RE_upper_red active. Accordingly, GIO<0> and GIO<2> may read out as normal from the second bit lines of sense amplifier set 318 and 314 respectively. The two redundant sense amplifier sets may also be activated, and the second bit line of each of those two sets may be read out onto GIO_red0 and GIO_red1 The values along GIO_red0 and GIO_red1 may then be swapped onto GIO<1> and GIO<3> such that the overall output includes information from the redundant bit lines associated with redundant sense amplifier set 311 and 321.

Figure 4:
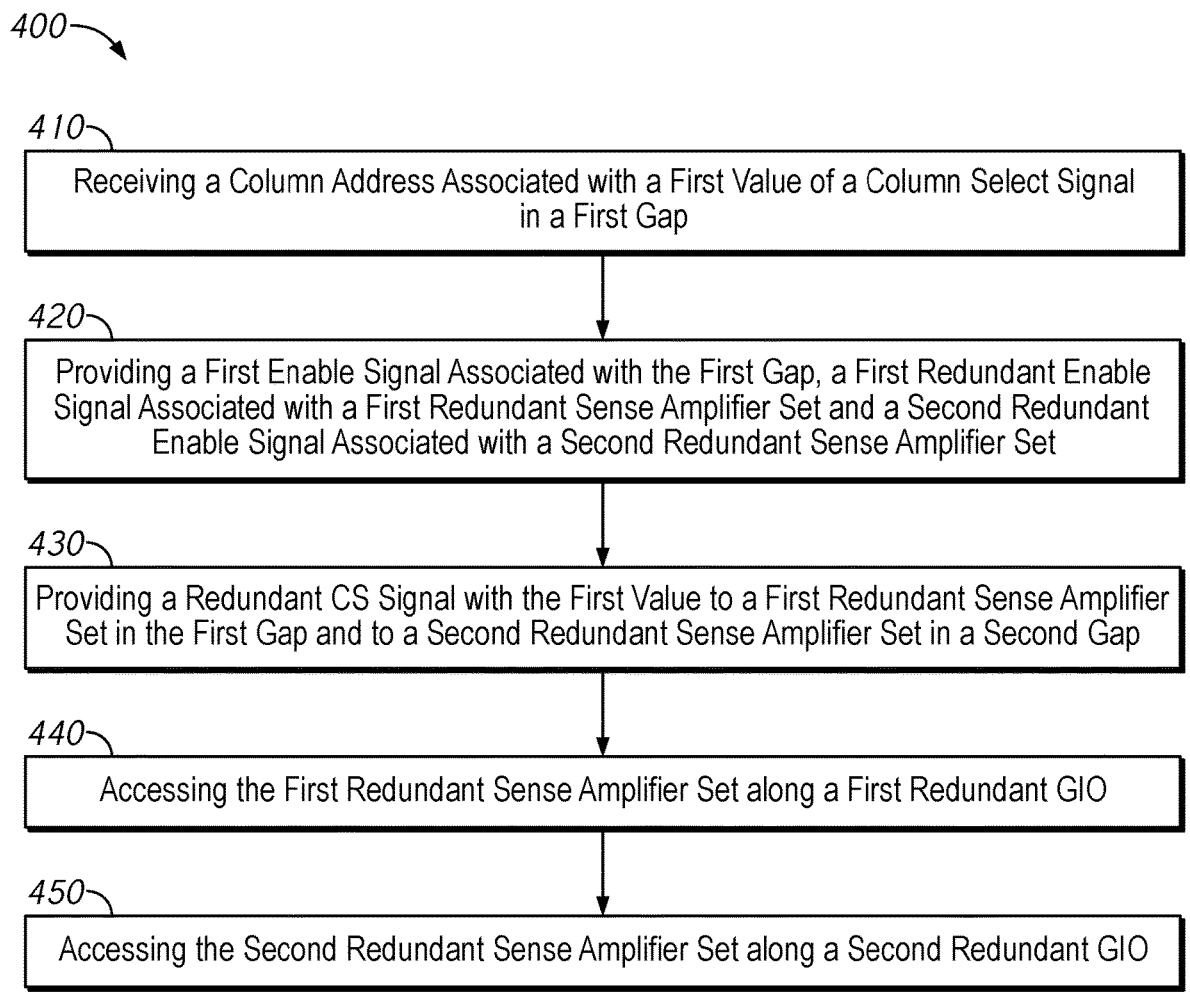
FIG. 4 is a flow chart of a method according to some embodiments of the present disclosure.

FIG. 4 is a flow chart of a method according to some embodiments of the present disclosure. The method 400 may, in some embodiments, be implemented by the one or more of the apparatuses or systems described herein. For example, the method 400 may be implemented by the memory array portion 300 of FIG. 3.

The method 400 includes box 410, which describes receiving a column address associated with a first value of a column select signal in a first gap. For example, a based on signals received on a C/A terminal (e.g., from a controller of the memory), an address decoder (e.g., 104 of FIG. 1) may provide row, bank, and column addresses while a command decoder (e.g., 106 of FIG. 1) may provide access commands. The row and bank addresses may indicate a particular mat of a memory array (e.g., mat 310 of FIG. 3), while the column address may indicate which bit lines should be accessed. A column decoder (e.g., 110) may generate a column select signal with a value (e.g., which bit of the CS signal is active) based on the column address.

The method 400 may include providing a column select signal with the first value to sense amplifier sets in a first and second gap (e.g., 420 and 430 of FIG. 4) which border the memory mat (e.g., 410 of FIG. 4).

Block 420 describes providing a first enable signal associated with the first gap, a first redundant enable signal associated with the first redundant sense amplifier set, and a second redundant enable signal associated with the second redundant sense amplifier set.

Block 430 describes providing a redundant CS signal (e.g., CS_red) with the first value to a first redundant sense amplifier set (e.g., 311) in the first gap and to a second redundant sense amplifier set (e.g., 321) in a second gap. The redundant sense amplifier sets may be coupled to redundant bit lines (and to redundant memory cells) in the memory mat.

Block 430 may be followed by block 440 and 450, which describe accessing the first redundant sense amplifier set along a first redundant GIO and accessing the second redundant sense amplifier set along a second redundant GIO respectively. For example, the method 400 may include activating the sense amplifiers of the first redundant sense amplifier set responsive to the first redundant enable signal and coupling a first redundant bit line and first redundant sense amplifier to the first redundant GIO responsive to the first value of the redundant CS signal. The method 400 may also include activating the sense amplifiers of the second redundant sense amplifier set responsive to the second redundant enable signal and coupling a first redundant bit line and first redundant sense amplifier to the second redundant GIO responsive to the first value of the redundant CS signal.

The method 400 may include multiplexing a value of the first redundant GIO to a first GIO signal line and multiplexing a value of the second redundant GIO to a second GIO signal line. The first and the second. GIO signal lines may be based on which sense amplifier sets include the bit lines which were identified as defective.

The method 400 may include determining if the column address has been repaired example, the method 400 may include comparing the column address to a repaired column address with redundancy logic (e.g., 204 of FIG. 2). The repaired column address may be stored in a fuse array (e.g., 125 of FIG. 1). If the column address matches the repaired column address, then the method may continue to block 420. If the column address was not repaired, then the method 400 may include providing a first enable signal, but not the first or the second redundant enable signal.

While the steps of the method 400 may generally be shown as a sequence, with one block following another, it should be understood that the steps may represent operations within a memory which may have different timing from what is shown. For example, the enable signals described in block 430 may be provided before the CS signals or may be provided approximately simultaneously with the CS signals. Similarly, the steps of blocks 440 and 450 may occur at the same time in some embodiments.

Figure 5:
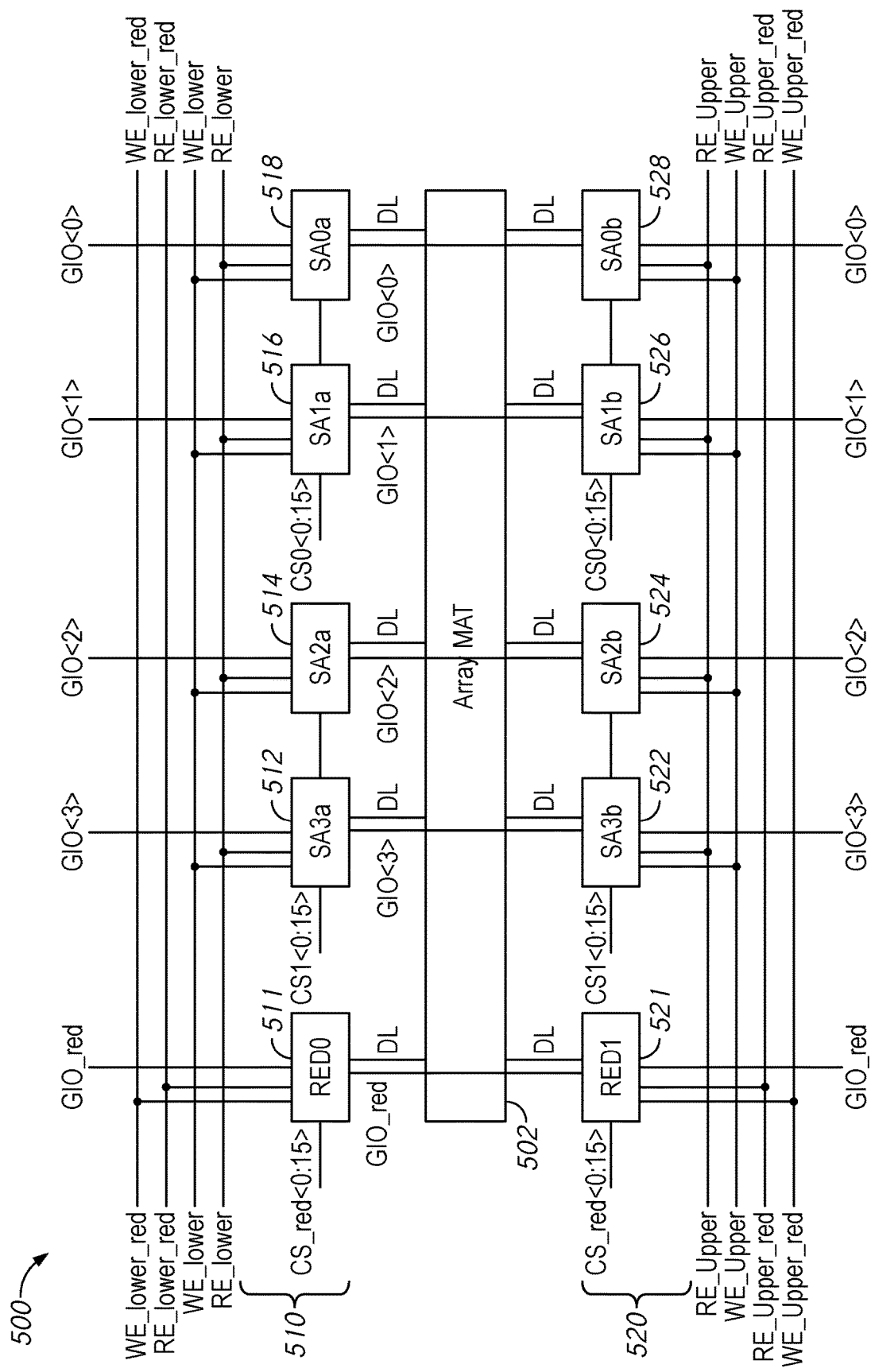
FIG. 5 is a schematic of a portion of a memory array according to some embodiments of the present disclosure.

FIG. 5 is a schematic of a portion of a memory array according to some embodiments of the present disclosure. The portion 500 may, in some embodiments, represent a portion of the memory array 118 of FIG. 1. The portion 500 shows a memory mat 502 along with sense amplifiers in the adjacent gaps 510 and 520. The mat 502 and gaps 510 and 520 may, in some example embodiments, be an implementation of mat 210 and regions 220 and 230 of FIG. 2. Each gap 510 and 520 includes sense amplifier sets 512-518 and 522-528 as well as redundant sets 511 and 521.

Since the portion 500 may be generally similar to the portion 300 of FIG. 3, for the sake of brevity, features, components and operations already described with respect to FIG. 3 which also apply to FIG. 5 will not be repeated again.

In the embodiment of FIG. 5, unlike the embodiment of FIG. 3, the two redundant sense amplifier sets 511 and 521 share a common GIO line, GIO_red. Also unlike FIG. 3, in the embodiment of FIG. 5, there are multiple CS signals. A first CS signal CS0 is coupled to sense amplifier sets 516, 518, 526, and 528, while a second CS signal CS1 is coupled to sense amplifier sets 512, 514, 522, and 524.

In an example repair operation, the redundancy control may 'swap' signals such that CS1 and CS0 are provided with different values such that the two bit lines which require repair (and which were previously associated with a same value of CS1 and CS0) are not active at the same time, and each of those bit lines (e.g., the first value of CS0 and the remapped second value of CS1) are repaired to a single redundant sense amplifier set in order to repair both bit lines. For example, testing may determine that a second bit line associated with sense amplifier set 512 and a second bit line associated with sense amplifier set 516, both associated with a same CS value (before the repair), need to be repaired. After the repair, during an example read operation, the column decoder may provide RE_lower and RE_lower_red at an active level, and may provide CS1 and CS_red with the second bit active, but may provide CS0 with the first bit active. In this manner, a second bit line is coupled to the GIO in the sense amplifier sets 512 and 514 and a first bit line coupled to the GIO in sense amplifier sets 516 and 518. Since it was the second hit line associated with set 516 which was defective, only one defective bit line (the second bit line of set 512) was activated. The signal CS_red may be provided with a second bit active, and a second bit line of the redundant set 511 is activated and read out along GIO_red. A multiplexer may swap the value of GIO_red onto GIO<3> in order to provide a complete set of GIO bits with no defects.

After the same repair, as part of a second example read operation, the signals RE_lower and RE_lower_red are both provided at an active level, this time along with CS0 with the second bit active, CS1 with a first bit active, and CS_red with a first bit active. Accordingly, the sense amplifier sets 512 and 514 may couple data from a first bit line onto GIO<3> and GIO<2> (e.g., with no defect since the error is on the second bit line of set 512) while the sets 516 and 518 may couple a second bit line of the sets 516 and 518 onto GIO<1> and GIO<0> with the bit along GIO<1> defective. The redundant sense amplifier set 511 couples data from a first redundant bit line onto GIO_red, which may be swapped onto GIO<1> to fix the defect and generate a complete repaired set of GIO bits.

The repair information in the fuse array (e.g., 125) of FIG. 1 may determine which bit lines are swapped and which GIO lines are swapped with GIO_red based on which access operations. While the example described with respect to FIG. 5 describes 'swapping' two adjacent bit lines, the present disclosure is not limited to adjacent bit lines being swapped. For example any two bit lines may be swapped based on repair information in the fuse array.

Figure 6:
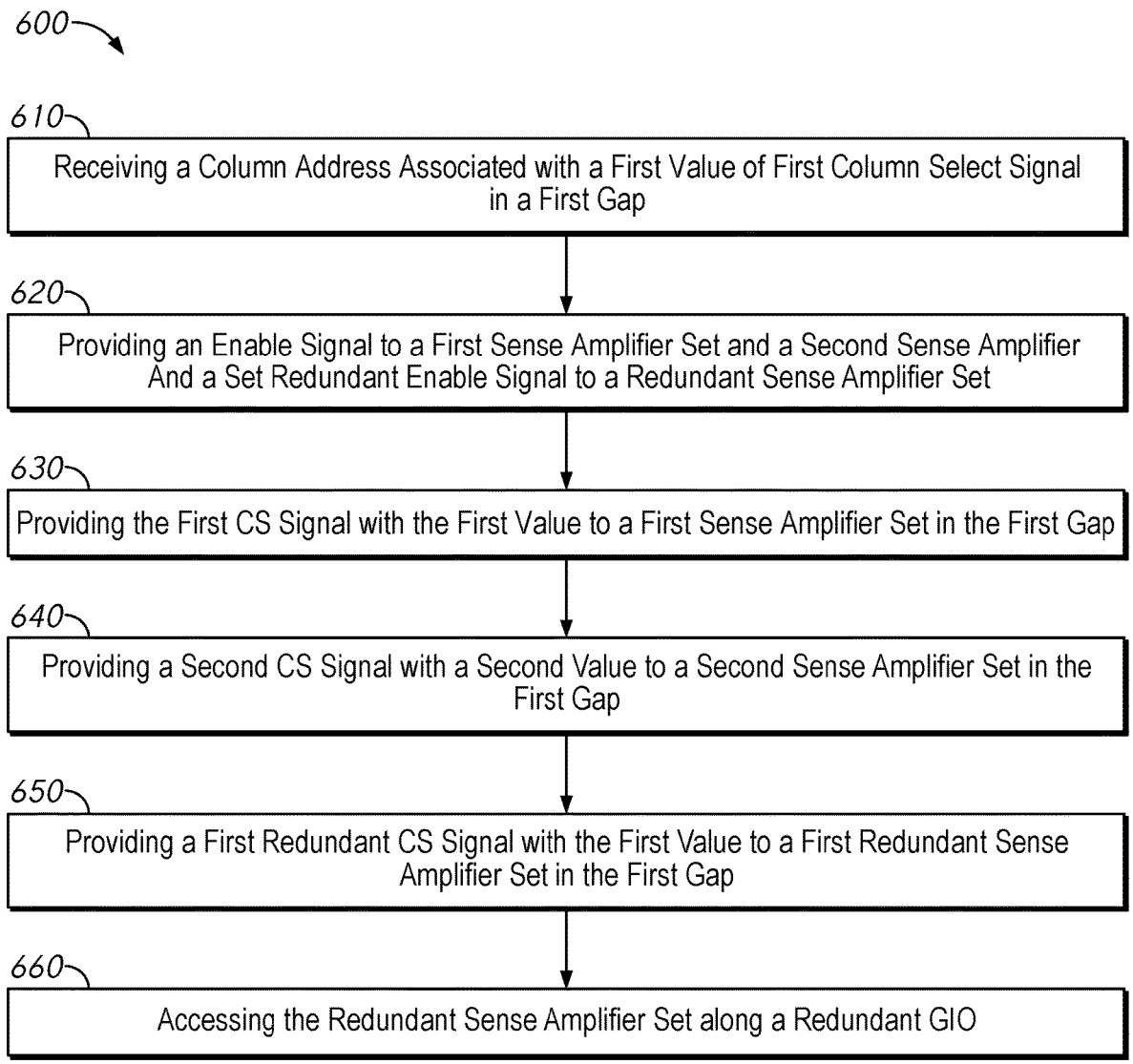
FIG. 6 is a flow chart of a method according to some embodiments of the present disclosure.

FIG. 6 is a flow chart of a method according to some embodiments of the present disclosure. The method 600 may, in some embodiments, be implemented by the one or more of the apparatuses or systems described herein. For example, the method 600 may be implemented by the memory array portion 500 of FIG. 5.

The method 600 includes box 610, which describes receiving a column address associated with a first value of a column select signal in a first gap. For example, based on signals received on a C/A terminal (e.g., from a controller of the memory), an address decoder (e.g., 104 of FIG. 1) may provide row, bank, and column addresses while a command decoder (e.g., 106 of FIG. 1) may provide access commands. The row and bank addresses may indicate a particular mat of a memory array (e.g., mat 510 of FIG. 3), while the column address may indicate which bit lines should be accessed. A column decoder (e.g., 110) may generate a column select signal with a value e.g., which bit of the CS signal is active) based on the column address.

The method 600 includes block 620, which describes providing an enable signal to the first and the second sense amplifier sets and a redundant enable signal to the redundant sense amplifier set.

Block 630 describes providing a first CS signal with the first value to a first sense amplifier set in the first gap. Block 640 describes providing a second CS signal with a second value to a second sense amplifier set in the first gap. For example, the method 600 may include swapping a first and second value of the second CS signal based on a repair operation. The first value may be associated with a first bit line in the first sense amplifier set which is defective and a first bit line in the second sense amplifier set which is defective. The second value may be associated with a second bit line in the first sense amplifier set and a second bit line in the second sense amplifier set which are not defective.

The method 600 includes block 650, which describes providing a first redundant CS signal with the first value to a first redundant sense amplifier set in the first gap. The method includes block 660, which describes accessing the redundant sense amplifier along a redundant GIO.

For example, the method 600 may include activating the sense amplifiers of the first and the second set responsive to the enable signal, activating the sense amplifiers of the redundant sense amplifier set responsive to the redundant enable signal, coupling a first bit line in the first sense amplifier set to a first GIO line responsive to the first CS signal with the first value, coupling a second bit line in the second sense amplifier set to a second GIO line responsive to the second CS signal with the second value, and coupling a first redundant bit line in the first redundant bit line set to a redundant GIO responsive to the redundant CS signal with the first value. The method may include multiplexing the redundant GIO onto the first GIO line.

The method 600 may include a second access operation which includes receiving a column address associated with the second value of the column select signal. The second access operation may include providing the first CS signal with the second value, the second CS signal with the first value, and the redundant CS signal with the second value, along with the enable and redundant enable signals. The second access operation may include activating the sense amplifiers of the first and the second set responsive to the enable signal, activating the sense amplifiers of the redundant sense amplifier set responsive to the redundant enable signal, coupling a second bit line in the first sense amplifier set to a first GIO line responsive to the first CS signal with the second value, coupling a first bit line in the second sense amplifier set to a second GIO line responsive to the second CS signal with the first value, and coupling a second redundant bit line in the first redundant sense amplifier set to the redundant GIO responsive to the redundant CS signal with the second value. The method may include multiplexing the redundant GIO onto the second GIO line.

The method 600 may include determining if the column address has been repaired. For example, the method 600 may include comparing the column address to a repaired column address with redundancy logic (e.g., 204 of FIG. 2). The repaired column address may be stored in a fuse array (e.g., 125 of FIG. 1). If the column address matches the repaired column address, then the method may continue to block 640. If the column address is not repaired, then the method 600 may include providing the first column select signal and the second column select signal with the first value to sense amplifier sets in a first and second gap (e.g., 620 and 630 of FIG. 4) which border the memory mat (e.g., 510 of FIG. 5). Similarly, if the column address is not repaired, then the method 600 may include providing the enable signal but not the redundant enable signal.

While the steps of the method 600 may generally be shown as a sequence, with one block following another, it should be understood that the steps may represent operations within a memory which may have different timing from what is shown. For example, the enable signals described in block 620 may be provided before the CS signals, after the CS signals or may be provided approximately simultaneously with the CS signals. Similarly, the steps of blocks 630-650 may occur at the same time in some embodiments.

Figure 7:
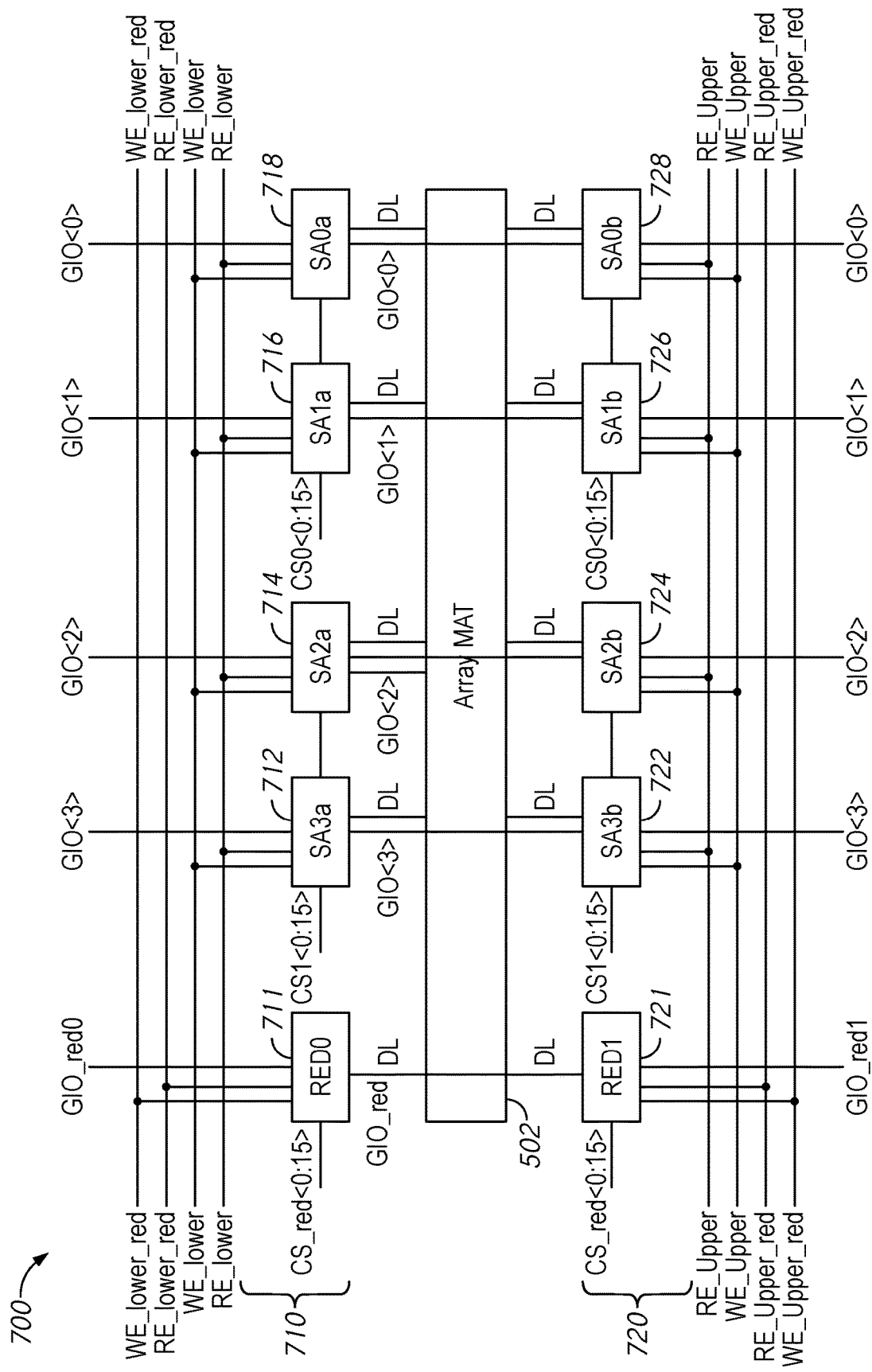
FIG. 7 is a schematic of a portion of a memory array according to some embodiments of the present disclosure.

FIG. 7 is a schematic of a portion of a memory array according to some embodiments of the present disclosure. The portion 700 may, in some embodiments, represent a portion of the memory array 118 of FIG. 1. The portion 700 shows a memory mat 702 along with sense amplifiers in the adjacent gaps 710 and 720. The mat 702 and gaps 710 and 720 may, in some example embodiments, be an implementation of mat 210 and regions 220 and 230 of FIG. 2. Each gap 710 and 720 includes sense amplifier sets 712-718 and 722-728 as well as redundant sets 711 and 721.

Since the portion 700 may be generally similar to the portion 300 of FIG. 3 and the portion 500 of FIG. 5, for the sake of brevity, features, components and operations already described with respect to FIGS. 3 and 5 which also apply to FIG. 7 will not be repeated again.

The example embodiment of FIG. 7 may combine the ideas of FIGS. 3 and 5. In the embodiment of FIG. 7, the two redundant GIO lines GIO_red0 and GIO_red1 are used (e.g., similar to FIG. 3) and in addition two CS signals are used CS1 and CS0 (e.g., similar to FIG. 5). This may allow even more repairs to be performed.

In an example repair operation, the redundancy control may 'swap' signals such that CS1 and CS0 are provided with different values, and each of those value is repaired to a single redundant sense amplifier set and in addition, repairs may also be made by selectively repairing bit lines to the redundant sense amplifier set in the opposite gap. For example, testing may determine that a second bit line associated with sense amplifier sets 712, 714, 716, and 718, all associated with a same CS value (before the repair), need to be repaired.

After a repair, during an example read operation when the column address indicates that a second bit line should be accessed, the column decoder provides RE_lower, RE_lower_red, and RE_upper_red at an active level, along with CS0 with a second bit active, CS1 with a first bit active (e.g., by swapping whether a column address activates the first and second value of the CS signals CS0 and CS1), and CS_red with the second bit active. Accordingly, a first bit line (e.g., a bit line without a defect) in each of the sense amplifier sets 712 and 714 are coupled to GIO<3> and GIO<2>. The signal CS0 may normally cause the defective second bit lines in the sense amplifier sets 716 and 718 to be coupled to GIO<1> and GIO<0> respectively. The signals CS_red having the second bit active as well as the signals RE_lower and RE_upper causes data to be read out from a second bit line of the redundant sense amplifier sets 711 and 721 onto GIO_red0 and GIO_red1 respectively. The values GIO_red0 and GIO_red1 may be swapped onto GIO<1> and GIO<0>. In this manner after the read operation, GIO<0> and GIO<1> may have data read from the redundant bit lines, while the bits GIO<2> and GIO<3> are read from swapped bit lines in the normal memory which do not have errors.

During a second example read operation the column address may indicate that a first bit line should be accessed and the column decoder may provide RE_lower, RE_lower_red, and RE_upper_red at an active level, along with CS0 with the first bit active, CS1 with a second bit active (e.g., by swapping the first and second bit values of CS1), and CS_red with the first bit active. Accordingly, data along GIO<0> and GIO<1> is read out from a respective first bit line from sense amplifier sets 718 and 716 (e.g., from bit lines without a defect). The second bit lines (e.g., with defects) are coupled to GIO<2> and GIO<1> from the sense amplifier sets 714 and 712. In addition, data from a first redundant bit lines of the sets 711 and 721 is read out to GIO_red0 and GIO_red1 respectively. The values on GIO_red0 and GIO_red1 are swapped onto GIO<2> and GIO<3>. In this manner, the GIO<0> and <1> are read out from bit lines which do not have errors, and the GIO<2> and GIO<3> are read out from redundant bit lines.

In this manner, even though all four of the bit lines which share a same CS value (e.g., the second bit lines associated with each of the sets 712-718) are defective, all four of them may be repaired.

Figure 8:
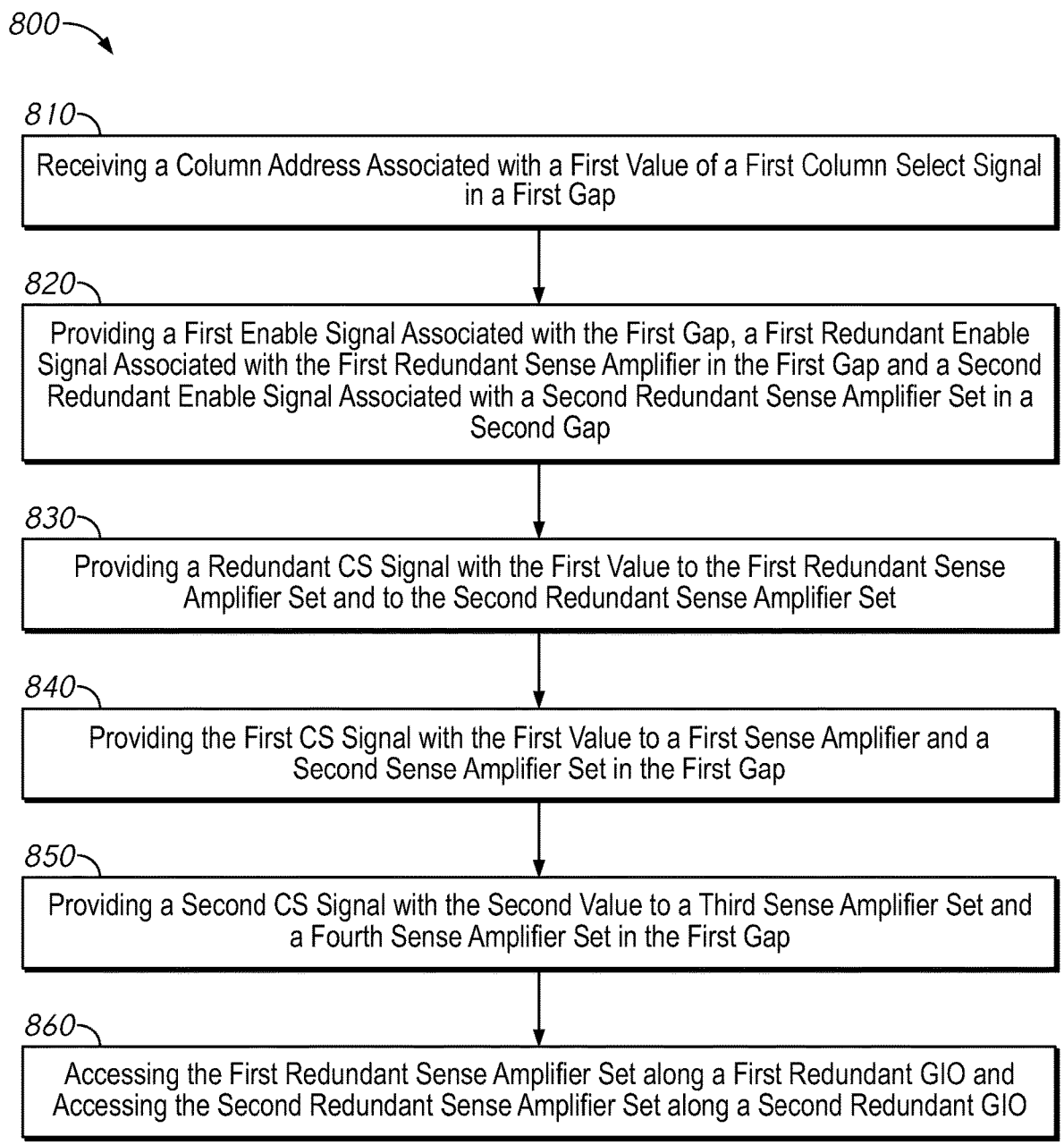
FIG. 8 is a flow chart of a method according to some embodiments of the present disclosure.

FIG. 8 is a flow chart of a method according to some embodiments of the present disclosure. The method 800 may, in some embodiments, be implemented by the one or more of the apparatuses or systems described herein. For example, the method 800 may be implemented by the memory array portion 700 of FIG. 7.

The method 800 includes box 810, which describes receiving a column address associated with a first value of a column select signal in a first gap. For example, based on signals received on a C/A terminal (e.g., from a controller of the memory), an address decoder 104 of FIG. 1) may provide row, bank, and column addresses while a command decoder (e.g., 106 of FIG. 1) may provide access commands. The row and bank addresses may indicate a particular mat of a memory array (e.g., mat 510 of FIG. 3), while the column address may indicate which bit lines should be accessed. A column decoder (e.g., 110) may generate a column select signal with a value (e.g., which bit of the CS signal is active) based on the column address.

The method 800 includes box 820, which describes providing a first enable signal (e.g., RE_lower or WE_lower) associated with a first gap, a first redundant enable signal (e.g., RE_lower_red or WE_lower_red) associated with a first redundant sense amplifier set in the first gap and a second redundant enable signal (RE_upper_red or WE_upper_red) associated with a second redundant sense amplifier set in a second gap. The first and the second gap may be on opposite sides of a memory mat.

The method 800 includes box 830, which describes providing a redundant CS signal with the first value to the first redundant sense amplifier set and to the second redundant sense amplifier set. The method 800 also includes box 840, which describes providing a first CS signal with the first value to a first sense amplifier set and a second sense amplifier set in the first gap and box 850, which describes providing a second CS signal with a second value to a third sense amplifier set and a fourth sense amplifier set in the first gap. For example, the method 800 may include swapping a first and second value of the second CS signal (compared to the first CS signal).

The method 800 includes box 860, which describes accessing the first redundant sense amplifier set along a first redundant GIO and accessing the second redundant sense amplifier set along a second redundant GIO.

For example, the method 800 may include activating the sense amplifiers of the first second, third, and fourth sense amplifier sets responsive to the enable signal, activating the sense amplifiers of the first redundant sense amplifier set responsive to the first redundant enable signal and activating the sense amplifiers of the second redundant sense amplifier set responsive to the second redundant enable signal. The method 800 may include coupling a first bit line in the first sense amplifier set to a first GIO line and a first bit line in the second sense amplifier set to a second GIO line responsive to the first CS signal with the first value, coupling a second bit line in the third sense amplifier set to a third GIO line and coupling a second bit line in the fourth sense amplifier set to a fourth GIO line responsive to the second CS signal with the second value, and coupling a first redundant bit line in the first redundant bit line set to a first redundant GIO responsive to the first redundant CS signal with the first value and coupling a first redundant bit line in the second redundant bit line set to the second redundant GIO responsive to the second redundant CS signal with the first value. The method may include multiplexing the first redundant GIO onto the first GIO line and the second redundant GIO line onto the second GIO line.

The method 800 may include a second access operation which includes receiving a column address associated with the second value of the column select signal. The second access operation may activating the sense amplifiers of the first second, third, and fourth sense amplifier sets responsive to the enable signal, activating the sense amplifiers of the first redundant sense amplifier sett, responsive to the first redundant enable signal and activating the sense amplifiers of the second redundant sense amplifier set responsive to the second redundant enable signal. The second access operation may include providing the first column select signal with the second value, the second column select signal with the first value, and the first and the second redundant column select signals with the second value. The method 800 may include coupling a second bit line in the first sense amplifier set to a first GIO line and a second bit line in the second sense amplifier set to a second GIO line responsive to the first CS signal with the second value, coupling a first bit line in the third sense amplifier set to a third GIO line and coupling a first bit line in the fourth sense amplifier set to a fourth GIO line responsive to the second CS signal with the first value, and coupling a second redundant bit line in the first redundant bit line set to a first redundant GIO responsive to the first redundant CS signal with the second value and coupling a second redundant bit line in the second redundant bit line set to the second redundant GIO responsive to the second redundant CS signal with the second value. The method may include multiplexing the first redundant GIO onto the third GIO line and the second redundant GIO line onto the fourth GIO line.

The method 800 may include determining if the column address has been repaired. For example, the method 800 may include comparing the column address to a repaired column address with redundancy logic (e.g., 204 of FIG. 2). The repaired column address may be stored in a fuse array (e.g., 125 of FIG. 1). If the column address matches the repaired column address, then the method may continue to block 820. If the column address is not repaired, then the method 800 may include providing the first column select signal and the second column select signal with the first value to sense amplifier sets in a first and second gap (e.g., 620 and 630 of FIG. 4) which border the memory mat (e.g., 510 of FIG. 5). Similarly, if the column address is not repaired, then the method 600 may include providing the enable signal but not the redundant enable signals.

While the steps of the method 800 may generally be shown as a sequence, with one block following another, it should be understood that the steps may represent operations within a memory which may have different timing from what is shown. For example, the enable signals described in block 820 may be provided before the CS signals, after the CS signals or may be provided approximately simultaneously with the CS signals. Similarly, the steps of blocks 830-850 may occur at the same time in some embodiments.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. An apparatus comprising:
    a first set of sense amplifiers comprising a first plurality of sense amplifiers, a selected one of which is coupled to a first global input/output (GIO) line, wherein the selected one of the first plurality of sense amplifiers is selected by a value of a first column select signal;
    a second set of sense amplifiers comprising a second plurality of sense amplifiers, a selected one of which is coupled to a second GIO line, wherein the selected one of the second plurality of sense amplifiers is selected by the value of the first column select signal; and
    a redundant set of sense amplifiers comprising a third plurality of sense amplifiers, a selected one of which is coupled to a redundant GIO line, wherein the selected one is selected based on a value of a redundant column select signal, wherein the redundant column select signal is different than the first column select signal.

2. The apparatus of claim 1, further comprising:
    a second redundant set of sense amplifiers comprising a fourth plurality of sense amplifiers, a selected one of which is coupled to a second redundant GIO line different than the redundant GIO line, wherein the selected one is selected based on a value of a second redundant column select signal which is different than the redundant column select signal.

3. The apparatus of claim 2, further comprising a memory mat, wherein the first set of sense amplifiers, the second set of sense amplifiers, and the redundant set of sense amplifiers are on a first side of the memory mat, and wherein the second redundant set of sense amplifiers are on a second side of the memory mat opposite the first side.

4. The apparatus of claim 1, further comprising:
    a third set of sense amplifiers comprising a fourth plurality of sense amplifiers, a selected one of which is coupled to a third GIO line, where the selected one of the third set of sense amplifiers is selected based on a value of a second column select signal different than the first column select signal, wherein the first, second, and third sets of sense amplifiers are in a same read/write gap.

5. The apparatus of claim 4, further comprising:
a second redundant set of sense amplifiers comprising a fifth plurality of sense amplifiers, a selected one of which is coupled to a second redundant GIO line different than the redundant GIO line, wherein the selected one is selected based on a value of a second redundant column select signal which is different than the redundant column select signal.

6. The apparatus of claim 4, further comprising:
a second redundant set of sense amplifiers comprising a fifth plurality of sense amplifiers, a selected one of which is coupled to the redundant GIO line, wherein the selected one is selected based on a value of the redundant column select signal.

7. The apparatus of claim 4, wherein when the first column select signal has a first value, the second column select signal has a second value, and when the first column select signal has the second value, the second column select signal has a first value.

8. The apparatus of claim 1, further comprising a first enable signal configured to activate the first and the second sets of sense amplifiers and a first redundant enable signal configured to activate the first redundant set of sense amplifiers.

9. The apparatus of claim 8, further comprising:
a second redundant set of sense amplifiers comprising a fourth plurality of sense amplifiers;
a memory mat, wherein the first set of sense amplifiers, the second set of sense amplifiers, and the first redundant set of sense amplifiers are positioned along a first side of the memory mat, and wherein the second redundant set of sense amplifiers are positioned along a second side of the memory mat opposite the first side; and
a second redundant enable signal configured to activate the second redundant set of sense amplifiers.

10. The apparatus of claim 8, further comprising a redundancy control circuit configured to receive a column address and provide the first redundant enable signal if the received column address matches a repair address associated with the first or the second set of sense amplifiers.

11. An apparatus comprising:
a first set of sense amplifiers comprising a first plurality of sense amplifiers, a selected one of which is coupled to a first global input/output (GIO) line, wherein the first set of sense amplifiers are activated by a first enable signal;
a second set of sense amplifiers comprising a second plurality of sense amplifiers, a selected one of which is coupled to a second GIO line, wherein the second set of sense amplifiers are activated by the first enable signal; and
a first redundant set of sense amplifiers comprising a third plurality of sense amplifiers, a selected one of which is coupled to a first redundant GIO line, wherein the redundant set of sense amplifiers are activated by a redundant enable signal different than the first enable signal; and
a second redundant set of sense amplifiers comprising a fourth plurality of sense amplifiers, a selected one of which is coupled to a second redundant GIO line different than the first redundant GIO line, wherein the second redundant set of sense amplifiers are activated by a second redundant enable signal different than the first enable signal,
wherein a first one of the first set, a first one of the second set, and a first one of the first redundant set of sense amplifiers or a second one of the first set, a second one of the second set, and a second one of the first redundant set of sense amplifiers are selected as the selected ones of the first set, the second set, and the first redundant set of sense amplifiers based on a column select signal.

12. The apparatus of claim 11, wherein the selected one of the second redundant set of sense amplifiers is selected based on a value of a second column select signal.

13. The apparatus of claim 11, further comprising:
a third set of sense amplifiers comprising a fifth plurality of sense amplifiers, a selected one of which is coupled to the first GIO line, wherein the third set of sense amplifiers are activated by a second enable signal; and
a fourth set of sense amplifiers comprising a sixth plurality of sense amplifiers, a selected one of which is coupled to the second GIO line, wherein the second set of sense amplifiers are activated by the second enable signal.

14. The apparatus of claim 13, further comprising a memory mat, wherein the first set of sense amplifiers, the second set of sense amplifiers, and the first redundant set of sense amplifiers are positioned on a first side of the memory mat, and wherein the third set of sense amplifiers, the fourth set of sense amplifiers, and the second redundant set of sense amplifiers are positioned on a second side of the memory mat opposite the first side.

15. The apparatus of claim 11, further comprising redundancy logic configured to receive a column address and provide the first redundant enable signal and the second redundant enable signal if the received column address matches a repair address associated with the first and the second set of sense amplifiers.

16. The apparatus of claim 11, wherein the first one of the first set, a first one of the second set, and a first one of the first redundant set of sense amplifiers are selected based on a first value of the column select signal, wherein the second one of the first set, a second one of the second set, and a second one of the first redundant set of sense amplifiers are selected based on a second value of the column select signal.

17. A method comprising:
receiving a column address associated with a first value of a first column select (CS) signal in a first gap;
providing a first enable signal associated with the first gap, a first redundant enable signal associated with a first redundant sense amplifier set in the first gap and a second redundant enable signal associated with a second redundant sense amplifier set in a second gap;
providing the first CS signal with the first value to the first redundant sense amplifier set and a plurality of first sense amplifier sets in the first gap;
selecting a first sense amplifier of the plurality of first sense amplifier sets and a sense amplifier of the first set of redundant sense amplifiers or a second sense amplifier of the plurality of first sense amplifier sets and a second sense amplifier of the first set of redundant sense amplifiers based on the first CS signal;
providing a second CS signal to the second redundant sense amplifier set and a plurality of second sense amplifier sets in the second gap;
accessing the first redundant sense amplifier set along a first redundant global input/output (GIO) line; and
accessing the second redundant sense amplifier set along a second redundant GIO.

18. The method of claim 17, further comprising determining if the column address has been repaired, and if the column address has not been repaired, providing the first enable signal but not the first redundant enable signal or the second redundant enable signal.

19. The method of claim 17, further comprising:
multiplexing the first redundant GIO onto a first GIO associated with a first sense amplifier set in the first gap; and
multiplexing the second redundant GIO onto a second GIO associated with a second sense amplifier set in the first gap.

20. The method of claim 17, further comprising:
activating sense amplifiers in a first sense amplifier set and sense amplifiers in a second sense amplifier set in the first gap responsive to the first enable signal;
activating redundant sense amplifiers in the first redundant sense amplifier set responsive to the first redundant enable signal; and
activating redundant sense amplifiers in the second redundant sense amplifier set responsive to the second redundant enable signal.

21. The method of claim 17, further comprising:
selecting a sense amplifier of the second set of redundant sense amplifiers based on a value of the second CS signal.

22. The method of claim 17, further comprising providing the second CS signal with the first value or with a second value different than the first value.

* * * * *